United States Patent [19]
Oberlin et al.

[11] Patent Number: 5,784,706
[45] Date of Patent: Jul. 21, 1998

[54] VIRTUAL TO LOGICAL TO PHYSICAL ADDRESS TRANSLATION FOR DISTRIBUTED MEMORY MASSIVELY PARALLEL PROCESSING SYSTEMS

[75] Inventors: Steven M. Oberlin, Chippewa Falls; Eric C. Fromm, Eau Claire; Randal S. Passint, Chippewa Falls, all of Wis.

[73] Assignee: Cray Research, Inc., Eagan, Minn.

[21] Appl. No.: 165,814

[22] Filed: Dec. 13, 1993

[51] Int. Cl.⁶ .......................... G06F 12/10; G06F 12/06
[52] U.S. Cl. .......................... 711/202; 711/203; 711/205; 711/206; 711/207; 711/208
[58] Field of Search .......................... 395/400, 425, 395/550, 800, 24, 412, 413, 415, 416, 417, 418; 364/200

[56] References Cited

U.S. PATENT DOCUMENTS

| | | | |
|---|---|---|---|
| 4,523,273 | 6/1985 | Adams et al. | 395/800 |
| 4,654,791 | 3/1987 | Ushiro | 364/200 |
| 4,985,829 | 1/1991 | Thatte et al. | 364/200 |
| 5,117,350 | 5/1992 | Parrish et al. | 395/425 |
| 5,151,969 | 9/1992 | Petsche | 395/24 |
| 5,165,028 | 11/1992 | Zulican | 395/400 |
| 5,247,629 | 9/1993 | Casamatta et al. | 395/412 |
| 5,392,416 | 2/1995 | Toshio et al. | 395/425 |
| 5,404,485 | 4/1995 | Ban | 395/412 |
| 5,434,995 | 7/1995 | Oberlin et al. | 395/550 |

FOREIGN PATENT DOCUMENTS

WO-A-8801772  10/1988  WIPO.

OTHER PUBLICATIONS

Information Processing 89, Proceeding of the IFIP 11th World Computer Congress, 28 Aug. 1989 San Francisco, US, pp. 995–1000, XP 000079023, Murakami et al., "The Kyushu University Reconfigurable Parallel Processor–Design Philosophy and Architecture", see abstract, see p. 999, right col., line 7–p. 1000, left col., line 8; Figure 6.

Distributed Computing, vol. 1, No. 4, Oct. 1986, Berlin DE, pp. 187–196, XP 000054632 Dally et al., "The torus routing chip", see p. 190, left col., line 1–p. 191, right col., line 22.
Patent Abstracts of Japan, vol. 017, No. 602 (P–1638), Nov. 5, 1993, and JP.A.05 181751 (Fujitsu Ltd), Jul. 1993.
Tom MacDonald, et a. "Addressing in Cray Research's MPP Fortran," *Proceedings, Third Workshop on Compilers for Parallel Computers,* ACPC/TR, Jul., 1992.
Erik P. DeBenedictis, et al. "Extending Unix for Scalable Computing," *Computer,* vol. 26, No. 11, pp. 43–53, Nov., 1993.
David Loveman, "Element Array Assignment–the Forall Statement," *Proceedings, Third Workshop on Compilers for Parallel Computers,* ACPC/TR, Jul., 1992.
Min–You, Wu, et al., "DO and Forall: Temporal and Spacial Control Structures," *Proceedings, Third Workshop on Compilers for Parallel Computers,* ACPC/TR, Jul., 1992.
Philip J. Hatcher, et al., "Compiling Data–Parallel Programs for MIMD Architectures," *Proceedings, Third Workshop on Compilers for Parralel Computers,* ACPC/TR, Jul., 1992.
Barbara Chapman, et al., "Programming in Vienna Fortran," *Procceedings, Third Workshop on Compilers for Parallel Computers,* ACPC/TR, Jul., 1992.

*Primary Examiner*—David K. Moore
*Assistant Examiner*—Than V. Nguyen
*Attorney, Agent, or Firm*—Schwegman, Lundberg, Woessner & Kluth, P.A.

[57] ABSTRACT

Address translation means for distributed memory massively parallel processing (MPP) systems include means for defining virtual addresses for processing elements (PE's) and memory relative to a partition of PE's under program control, means for defining logical addresses for PE's and memory within a three-dimensional interconnected network of PE's in the MPP, and physical addresses for PE's and memory corresponding to identities and locations of PE modules within computer cabinetry. As physical PE's are mapped into or out of the logical MPP, as spares are needed, logical addresses are updated. Address references generated by a PE within a partition in virtual address mode are converted to logical addresses and physical addresses for routing on the network.

19 Claims, 19 Drawing Sheets

VIRTUAL TO LOGICAL TO PHYSICAL ADDRESS TRANSLATION FOR DISTRIBUTED MEMORY MASSIVELY PARALLEL PROCESSING SYSTEMS

FIELD OF THE INVENTION

The present invention relates generally to addressing techniques for massively parallel processing systems, and more particularly to techniques for translation of addresses from virtual to logical to physical addresses in distributed memory massively parallel processing systems.

BACKGROUND OF THE INVENTION

Massively parallel processing involves the utilization of many hundreds or thousands of processing elements (PE's) linked together by high speed interconnect networks. A distributed memory processing system is one wherein each processor has a favored low latency, high bandwidth path to a group of local memory banks, and a longer latency, lower bandwidth access to the memory banks associated with other processors (remote or global memory) over the interconnect network. In shared memory systems all memory is directly addressable by any processor in the system, either through local access to data residing in the processor's own local memory, or through a remote access to data residing in the memory local to another processor.

In addition to handling local and remote addressing, such systems must also be able to handle address translations from virtual processor addresses to logical processor addresses, and preferrably also to physical processor addresses. Virtual to logical address translation techniques used in smaller multiprocessor systems may not be adequate, or may fail to take full advantage of the performance and flexibility potentials, when applied to massively parallel systems. The large number of processors, and the great variation in size, location and shape of partitions of processors can present problems in addressing in massively parallel systems. Also, the use of a three-dimensional interconnect network between processing elements, and the need to accomodate spare PEs to replace failed ones, further complicate the design of an addressing system.

SUMMARY OF THE INVENTION

To overcome limitations in the art described above and to overcome other limitations that will become apparent upon reading and understanding the present specification, the present invention provides an improved addressing system that provides translation of addresses from virtual PE addresses, to logical PE addresses, to physical PE addresses, in a massively parallel shared, distributed memory system. The system of this invention can handle three-dimensional interconnect networks and partitions, and can handle conversion of logical addresses to physical addresses, to permit mapping our failed PEs and replacing them with spare PEs.

BRIEF DESCRIPTION OF THE DRAWINGS

The foregoing and other objects, features and advantages of the invention, as well as the presently preferred embodiments thereof, will become apparent upon reading and understanding the following detailed description and accompanying drawings in which.

DETAILED DESCRIPTION OF THE PREFERRED EMBODIMENT

In the following detailed description of the preferred embodiment, reference is made to the accompanying drawings which form a part hereof, and in which is shown by way of illustration a specific embodiment in which the invention may be practiced. Reference is also made to the attached Appendix A which forms a part of this specification, and which contains Tables referred to in the following description of the preferred embodiment. It is to be understood that other embodiments may be utilized and structural changes made without departing from the scope of the present invention.

The preferred MPP system, for which the present invention provides address translation, is a MIMD massively parallel multiprocessor with a physically distributed, globally addressable memory. A individual MPP system may contain hundreds or thousands of processors, each accompanied by a local memory and associated support circuitry. Each processor, local memory and support circuity component is called a processing element (PE). In the preferred embodiment, there are two PEs per node, and all the nodes are linked via an interconnect network. It will be appreciated that the invention could be applied to designs with more or fewer than two PEs per node.

Figure 1:
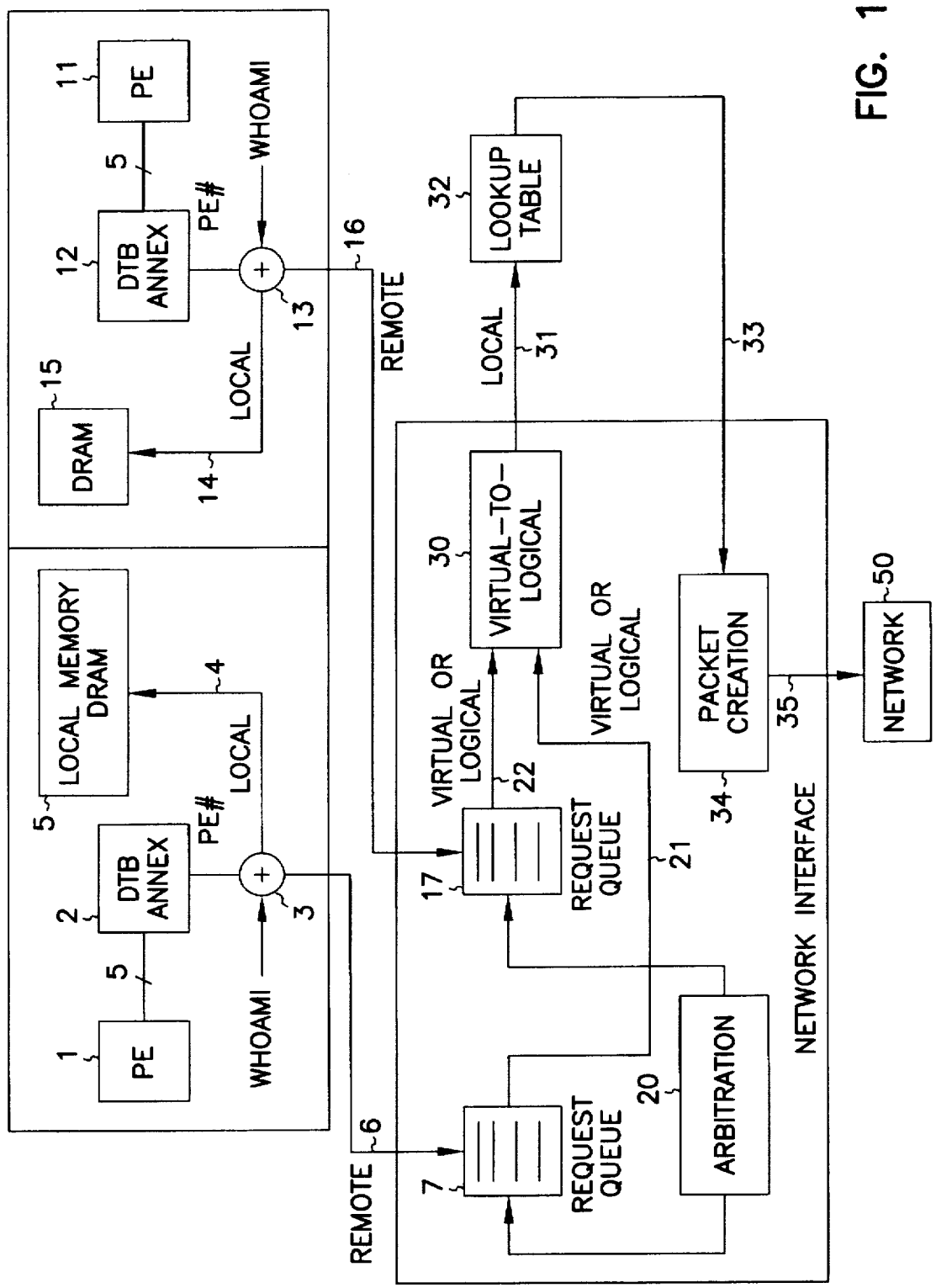
FIG. 1 shows a block diagram of a node of an MPP system for connection to the interconnect network, having a pair of PEs, local memory, and address translation elements, according to the preferred embodiment of the invention.

In FIG. 1 a single node of the MPP system has a pair of PEs indicated by reference numbers 1 and 11. PE 1 connects over a data path to a DTB ANNEX 2. DTB ANNEX 2 connects to a comparison element 3. which also receives identification data WHOAMI. Comparison element 3 connects to a LOCAL reference data path 4 to Local DRAM Memory indicated by reference number 5, and to REMOTE reference data path 6. The functions and operation of these elements will be explained below in this specification.

PE 11 connects to DTB ANNEX 12, which connects to comparison element 13. which also receives its own identification data WHOAMI. Comparison element 13 connects to a LOCAL reference data path 14 to Local DRAM Memory indicated by reference number 15, and to REMOTE reference data path 16.

A network interface 48 comprises REQUEST QUEUES 7 and 17, VIRTUAL-TO-LOGICAL converter 30, ARBITRATION element 20, and PACKET CREATION element 34. REMOTE reference data paths 6 and 16 connect to REQUEST QUEUEs 7 and 17, respectively, outputs of which connect over data paths 21 and 22 respectively fo VIRTUAL-TO-LOGICAL converter 30. The output of this element connects over path 31 to LOOKUP TABLE 32. The output of LOOKUP TABLE 32 connects to element 34, PACKET CREATION. This element in turn connects to the interconnect network 50 of the MPP system via a line 35. In practice, a great number of nodes such as is shown in FIG. 1 are all connected to Network 50.

Figure 2:
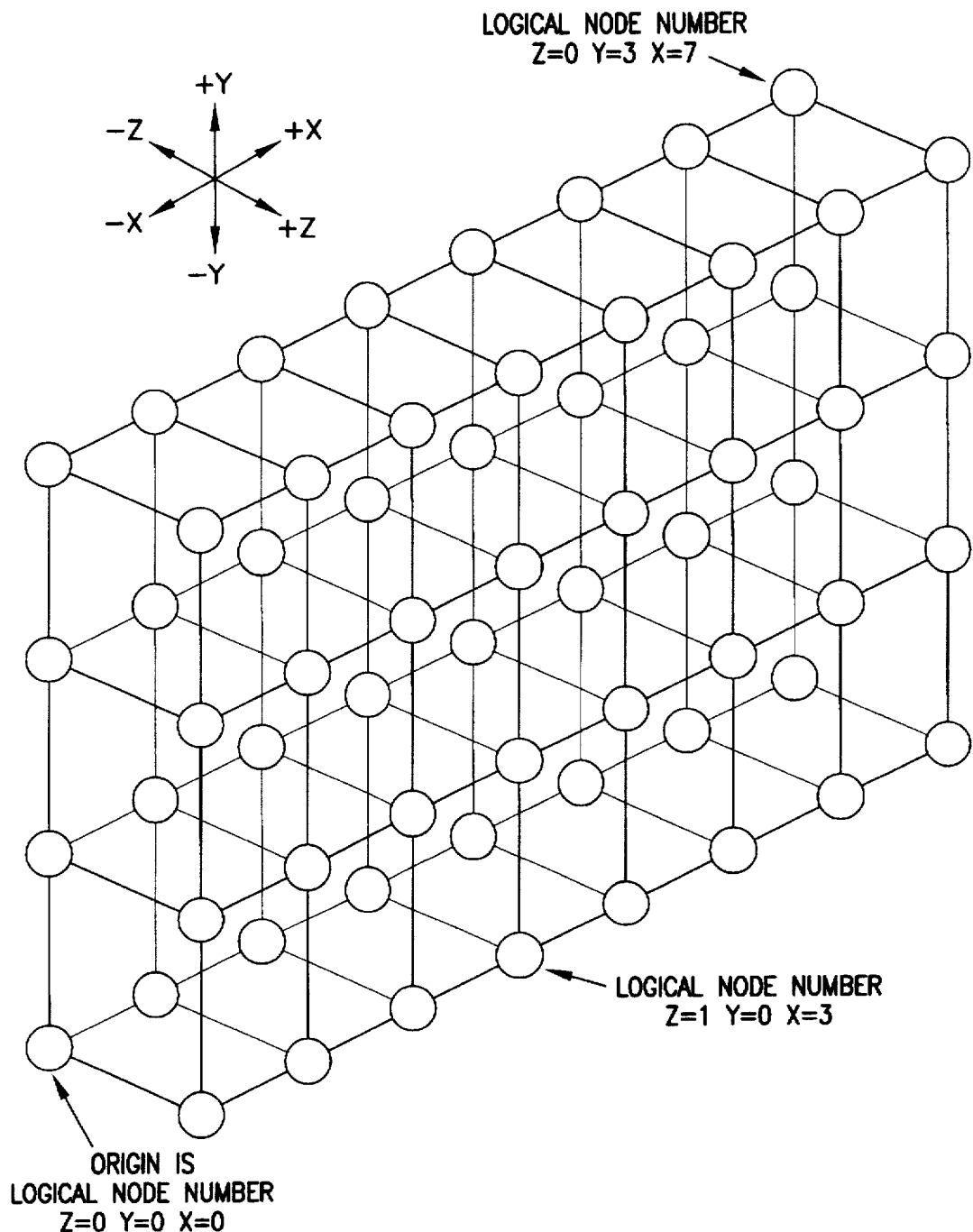
FIG. 2 is a diagram illustrating the logical relationship and numbering of nodes in a three-dimensionally interconnected MPP system.

The preferred MPP system has a physically distributed memory, wherein each processor 1, 11 has a favored, low latency, high bandwidth path to a local memory 5, 15 and a longer latency, lower bandwidth access to the memory banks associated with other processors over the interconnect network 50. In the preferred embodiment, the interconnect network is comprised of a 3-dimensional torus which when connected creates a 3-dimensional matrix of PEs. A portion of the network is shown in FIG. 2, wherein the dots represent nodes, and the lines between dots represent interconnections in the plus and minus x, y, and z directions. A torus contains communications links that connect the smallest numbered node in a dimension directly to the largest numbered node in the same dimension. This type of connection forms a ring where information can transfer from one node, through all of the nodes in the same dimension, and back to the original node. The torus design has several advantages, including speed of information transfers and the ability to avoid bad communication links. The interconnect network is also scalable in all three dimensions. An interconnect network of this nature is described in more detail in the copending and commonly assigned U.S. patent application Ser. No. 07/983, 979, entitled "Direction Order Routing in Multiprocessing Systems", to Gregory M. Thorsen, filed Nov. 30, 1992, which is incorporated herein by reference, and in copending and commonly assigned U.S. patent application Ser. No. 08/165,266 entitled "Multidimensional Interconnection and Routing Network for an MPP Computer", filed Dec. 10, 1993, to Mark S. Birrittella et al., which is incorporated herein by reference.

The MPP System connects to a host computer system. The host system runs the software compilers for the MPP system. All programs written for the MPP system are compiled on the host system, but run in the MPP system. The host system may be, for example, any Cray Research, Inc. computer system that has an input/output subsystem model E (IOS-E). Examples of host systems include the CRAY Y-MP E series computer systems, the CRAY Y-MP C90 series computer systems. The host system may reside in the same cabinet as the MPP system. This configuration is called a signal cabinet configuration. The whole system may also reside in a separate cabinet that is cabled to the MPP system cabinet. This configuration is called a multi-cabinet configuration.

ADDRESSING

Because the preferred MPP system to which the present invention is applied (MPP system) has a physically distributed, logically shared memory, the address generated by the microprocessor in a PE cannot be used to directly reference physical memory. This section describes the components and the process used to reference system data and registers in the MPP system.

Functional Description

The PEs within the MPP system can be identified using a virtual PE number, a logical PE number, and a physical PE number. The MPP system interprets the virtual PE as a PE within a user partition. A logical PE is a PE that is configured into the system (this excludes disabled spare node, I/O nodes, and faulty nodes). A physical PE is any PE within the system.

Addresses used in the MPP system can also be identified as virtual, logical, and physical. Each type of address contains information that the NPP system uses to address local memory, reference memory-mapped registers, and route packets through the network.

PE Numbering

Depending on the context, a PE is identified by one of three types of numbers: a physical PE number, a logical PE number, or a virtual PE number. All three types of numbers consists of a PE bit and a field containing the node number or node coordinates.

Physical PE Number

Every PE in the MPP system is assigned a unique number that indicates where the PE is physically located in a system. This number is the physical PE number.

The support circuitry in each PE contains a register called the physical PE register. When a circuit board is placed in the system cabinet, hardware automatically sets the bits of the physical PE register to indicate where the PE is located in the cabinet.

The physical PE number contains two parts: the physical node number and the PE bit. they physical node number indicates which physical node the PE is located in (PE node, space PE node, input node, or output node). The PE bit indicates PE 0 or PE 1 in a node. Table 1 shows a simplified physical PE number. More information on the exact bit format and use of the physical PE number is provided in "Register Mapping" below.

Logical PE Number

Not all of the physical PEs in a MPP system are part of the logical configuration of a MPP system. For example, a 512-PE MPP system may contain 520 physical PEs (not including PEs in the I/O gateways). Of these 520 PEs, 512 PEs are used in the logical system and 8 PEs (in 4 spare PE nodes) are used as spare PEs.

Each physical PE used in a logical system is assigned a unique logical PE number. The logical PE number identifies the location of a PE in the logical system of nodes.

The logical PE number contains two parts: the logical node number and the PE bit. The logical node number indicates which logical node the PE resides in (processing element node, input node, or output node). The PE bit indicates whether the PE is PE 0 or PE 1. Table 2 shows a simplified format of the logical PE number. More information on the exact bit format of the logical PE number is provided in "Register Mapping" below.

The logical nodes form a three-dimensional matrix of nodes. For example, FIG. 2 shows the logical PE nodes for a 128-PE MPP system. Although the system actually contains 69 physical PE nodes, only 64 of the nodes are used in the logical system. The remaining 4 spare physical nodes are physically connected to the interconnect network but are not given logical node numbers.

This type of configuration enables a spare node to logically replace a failing node. When this occurs, the spare node obtains a logical number and the failing node does not receive a new logical node number.

For example, when logical node Z=0, Y=2, X=3 fails to operate properly, the physical node assigned to this number may be removed from the logical system. A spare node is then assigned the logical node number Z=0, Y=2, X=3 and the failing node does not receive a logical node number.

Virtual PE Number

When an MPP application initiates, the support software running on the host system determines the resources needed for the application and creates a partition for the application to run in. A partition is a group of PEs and a portion of the barrier synchronization resources that are assigned to one application. More information of the barrier synchronization is provided in copending and commonly assigned U.S. patent application on "Barrier Synchronization for Distributed Memory Massively Parallel Processing Systems", filed Dec. 10, 1993, to Oberlin et al., which is incorporated herein by reference. The application uses virtual PE numbers to reference the PEs in a partition.

There are two types of partitions: an operating system partition and a hardware partition. In an operating system partition, when the application transfers data between PEs, the operating system must be involved with the transfer. (When multiple references to the same PE are made, the operating is involved with the first transfer to the remote PE. Subsequent transfer to the same PE do not involve the operating system.) The operating system converts the virtual PE numbers used by the application into logical PE numbers.

In a hardware partition, when the application transfers data between PEs, the operating system is not involved with the transfer. Hardware in each PE node converts the virtual PE numbers used by the application into logical PE numbers.

The virtual PE number contains two parts: The virtual node number and the PE bit. The virtual node number ranges from 1 to 10 bits and indicates which processing element node in a hardware partition the PE resides in. The PE bit indicates when the PE is PE0 or PE1 in the node (refer to Table 3).

The virtual node number has 0 to 3 bits assigned to the X dimension, 0 to 4 bits assigned the Y dimension, and 0 to 3 bits assigned to the Z dimension. By assigning bits of the virtual node number to the appropriate dimensions, software arranges the virtual nodes into one of several shapes. For example, a three-bit virtual node number indicates there are eight nodes in the hardware partition. These nodes may be arranged in 1 of 10 shapes.

Table 4 lists the possible node shapes for a three-bit virtual node number. For each shape, the number of nodes in each dimension is limited to powers of two (1, 2, 4, 8, 16, etc.).

Figure 3:
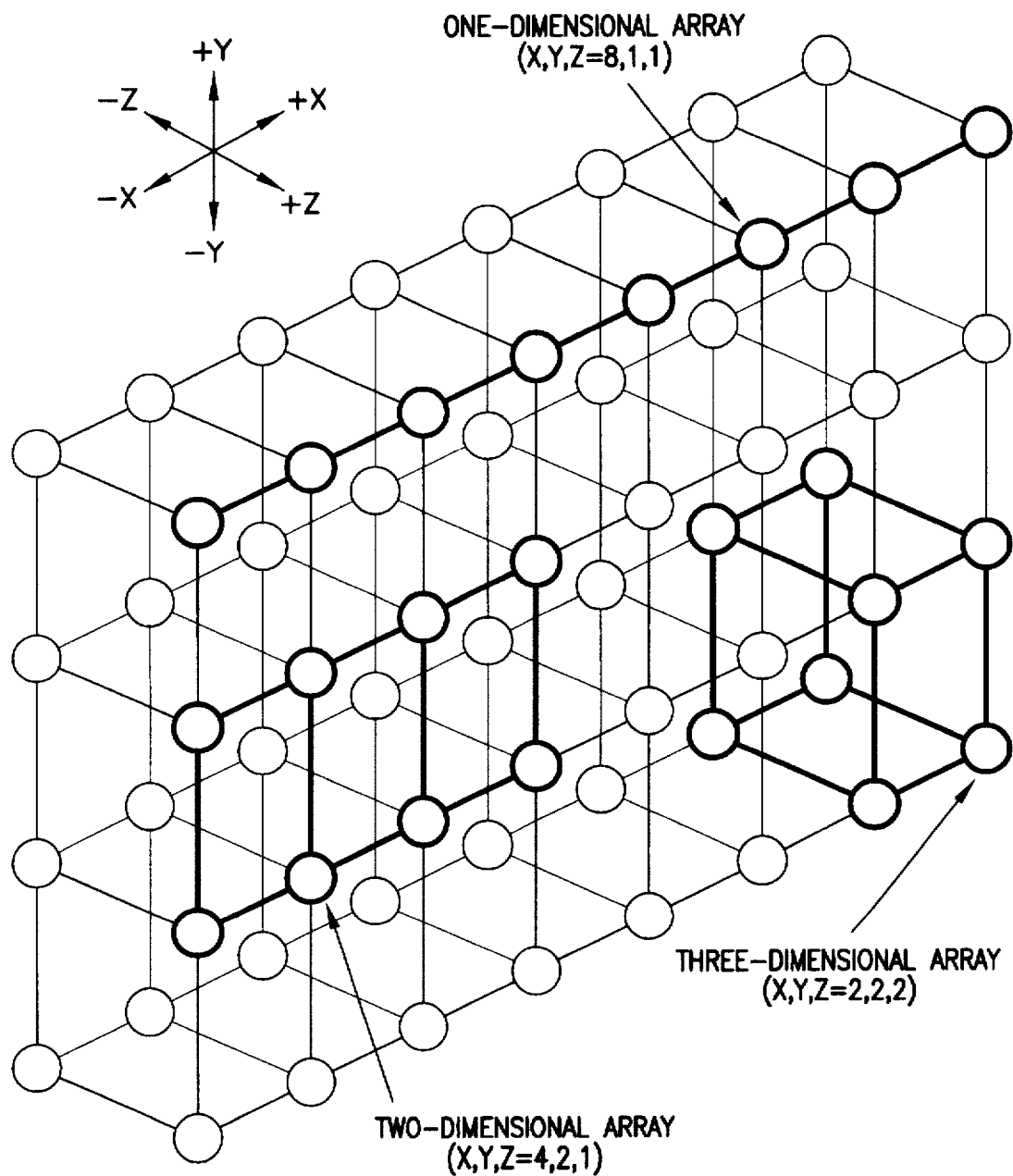
FIG. 3 is a diagram illustrating three 8-node partition shapes in an MPP system.

FIG. 3 shows three of the eight-node partition shapes in a 128-PE MPP system.

Figure 4:
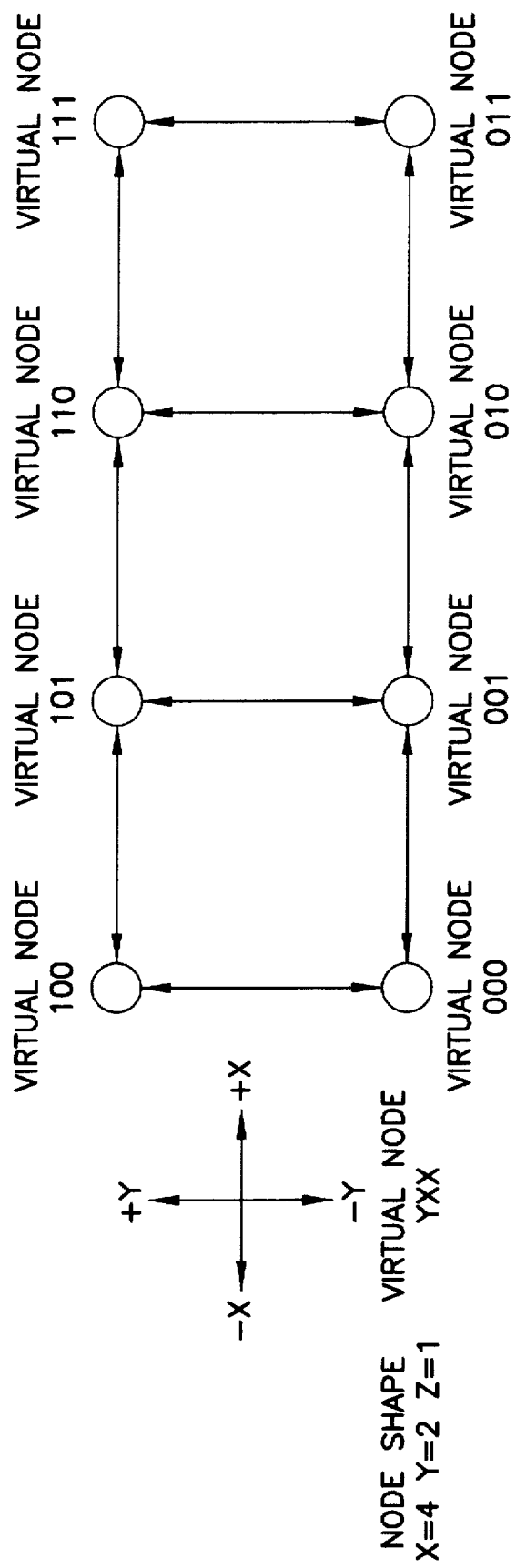
FIG. 4 is a diagram illustrating virtual node numbers for a two-dimensional array.

As an example of virtual PE numbers, FIG. 4 shows a two-dimensional, eight-node partition that contains 16 PEs. Each node in the partition is referred to by the three-bit virtual node numbers shown in FIG. 3.

Figure 5:
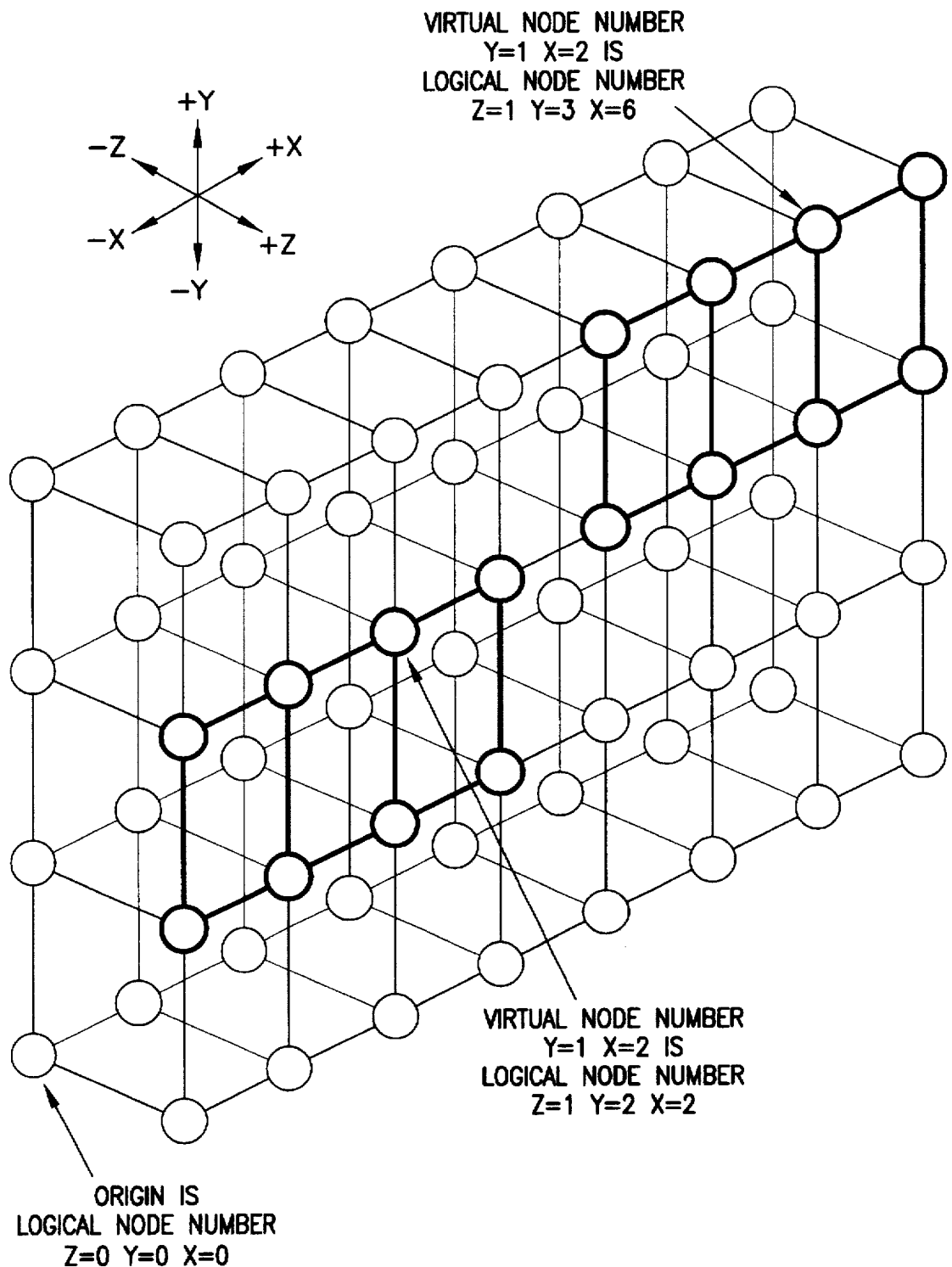
FIG. 5 is a diagram illustrating virtual and logical node numbers.

This two-dimensional array of eight nodes may actually correspond to one of many eight-node two-dimensional arrays in the logical system. For example, FIG. 5 shows two examples of how this two-dimensional array may be placed in the logical system of nodes in a 128-PE MPP system.

A virtual node number does not always correspond to the same logical node number. For example, FIG. 5 shows how virtual node Y=1 X=2 from FIG. 4 may correspond to either logical node number Z=1 Y=2 X=2 or logical node number Z=1 Y=3 X=6.

Microprocessor Address Interpretation

Application programs running in each PE generate a virtual address that the hardware in each microprocessor converts into a partial physical address. The following subsections describe both the virtual address and the partial physical address.

Virtual Address

The virtual address is a byte oriented address generated by a program compiler. The virtual address may contain three parts: a segment, a virtual index, and a virtual address offset. Table 5 shows the bit format of the virtual address. Although the length is 64 bits, only 41 bits of the address are actually used.

The microprocessor operating system software specifies how the microprocessor hardware maps the virtual address into the partial physical address. Because this process if defined by software, the format of the virtual address may be changeable, but the format shown in Table 5 is included as an example of how the microprocessor interprets a virtual address.

Segment

Figure 6:
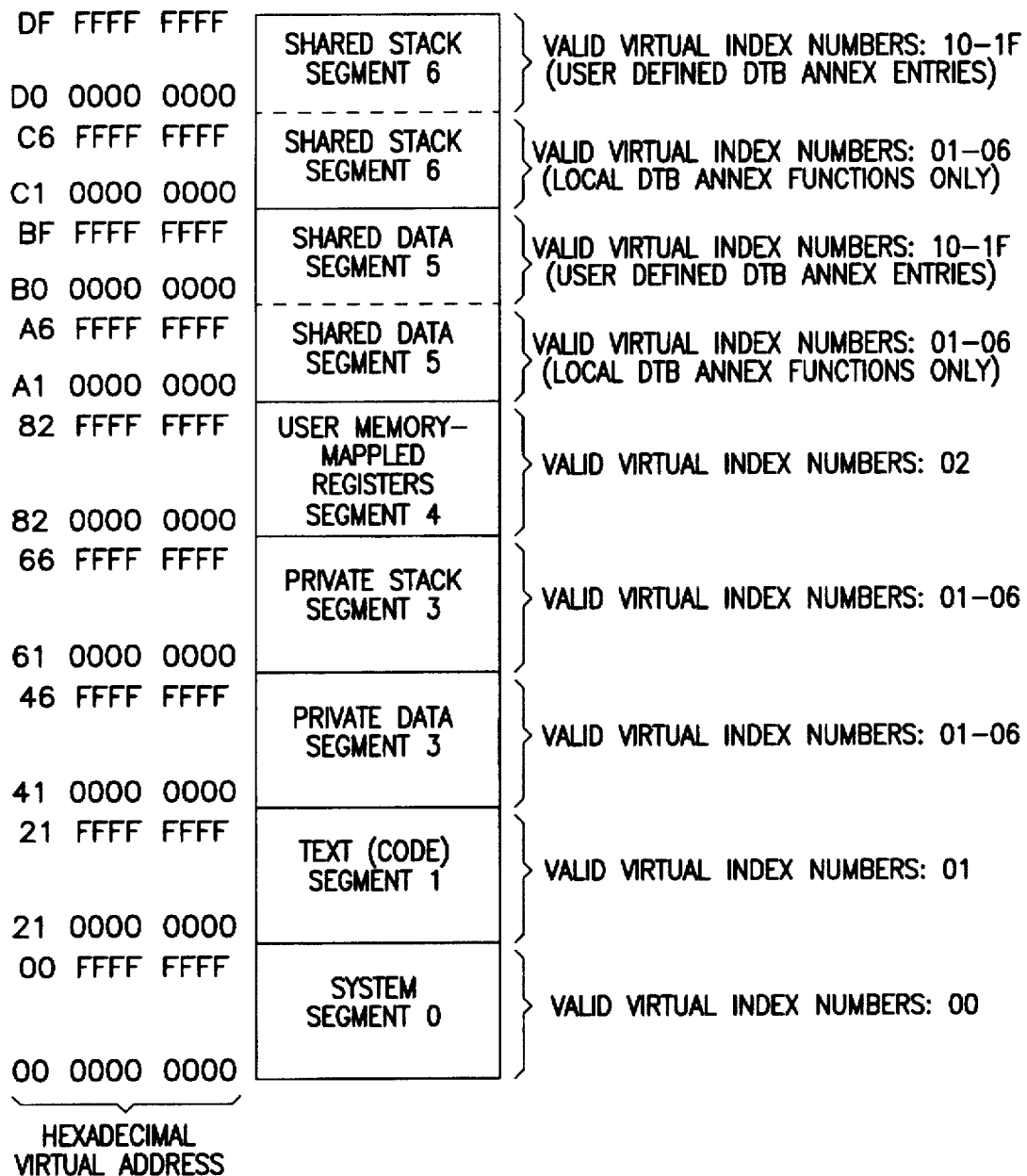
FIG. 6 is a diagram illustrating memory virtual address space.

The segment is a four-bit number that divides the virtual address space into up to 16 segments. Each segment identifies a unique type of memory. For example, when the segment number is set to 4, information may be written to or read from memory-mapped registers in the support circuitry of a PE or in other components of a PE node (refer to FIG. 6).

Some segments are designated as private and some segments are designated as shared. A private segment refers to information that is stored in the local memory of a PE and is used only by the microprocessor in the PE. Only the microprocessor in the PE can write to or read from a segment designated as private.

A shared segment refers to information that may be stored in any PE in the system and may be used by any microprocessor in a partition. The shared segments are located in the same area of local memory in all of the PEs within a partition.

Virtual Index

The virtual index is a 5-bit number that references one of the entries in the DTB annex. The DTB annex is a 32-entry table external to the microprocessor (in the support circuitry of a PE, references 2, 12 in FIG. 1) that contains information used to expand the addressing range of the microprocessor to include all of system memory. Each entry in the DTB annex contains two parts: a PE number and a memory function code (FC). Table 6 shows the format of a DTB annex entry.

The PE number contains a node number and PE bit. The node number can be a virtual node number or a logical node number. The PE bit indicates the PE in which the memory function will occur.

The function code is a 3-bit number that indicates the memory reference function that the PE will perform. Table 7 lists the function codes and the corresponding memory functions.

Each entry in the DTB annex describes a memory reference function that the PE will perform. Entry 0 of the DTB annex is reserved for use by the operating system and will always contain a logical PE number. Two bits of the system control register determine whether the remaining 31 entries contain virtual or logical PE numbers.

The system control register (SCR) is a memory-mapped register located in the support circuitry of a PE. When set to 1, bit 0 of the system control register enables entries 0 through 15 of the DTB annex so they may be written to by the user or the operating system (entries 1 through 15 are then interpreted as virtual PE numbers). When set to 0, bit 0 of the system control register disables the ability to write to entries 0 through 15 of the DTB annex (entries 0 through 15 are then interpreted as logical PE numbers).

Likewise, when set to 1, bit 1 of the system control register enables entries 16 through 31 of the DTB annex so they may be written to by the user or operating system (entries 16 through 31 are then interpreted as virtual PE numbers). When set to 0, bit 1 of the system control register disables the ability to write to entries 16 through 31 of the DTB annex (entries 16 through 31 are then interpreted as logical PE numbers).

Table 8 shows the entries for a sample DTB annex. In this example, bit 1 of the system control register is set to 1 and bit 0 is set to 0. Entry 0 is reserved for use by the operating system.

Virtual Address Offset

The virtual address offset is a byte oriented address that points to a byte within a segment of the virtual address space. The lower 32 bits of the virtual address define the offset. The virtual address offset may range from zero to four giga-bytes.

Partial Physical Address

After receiving the virtual address from an application program, hardware in the microprocessor converts the virtual address into a partial physical address. The partial physical address is an address that the microprocessor place on the address pins of the microprocessor.

In the MPP system, the address pins of the microprocessor do not directly address a physical memory. Instead, support circuitry in the PE interprets the partial physical address and routes data between the microprocessor and either local memory, memory-mapped registers, or memory in a remote PE.

Figure 7:
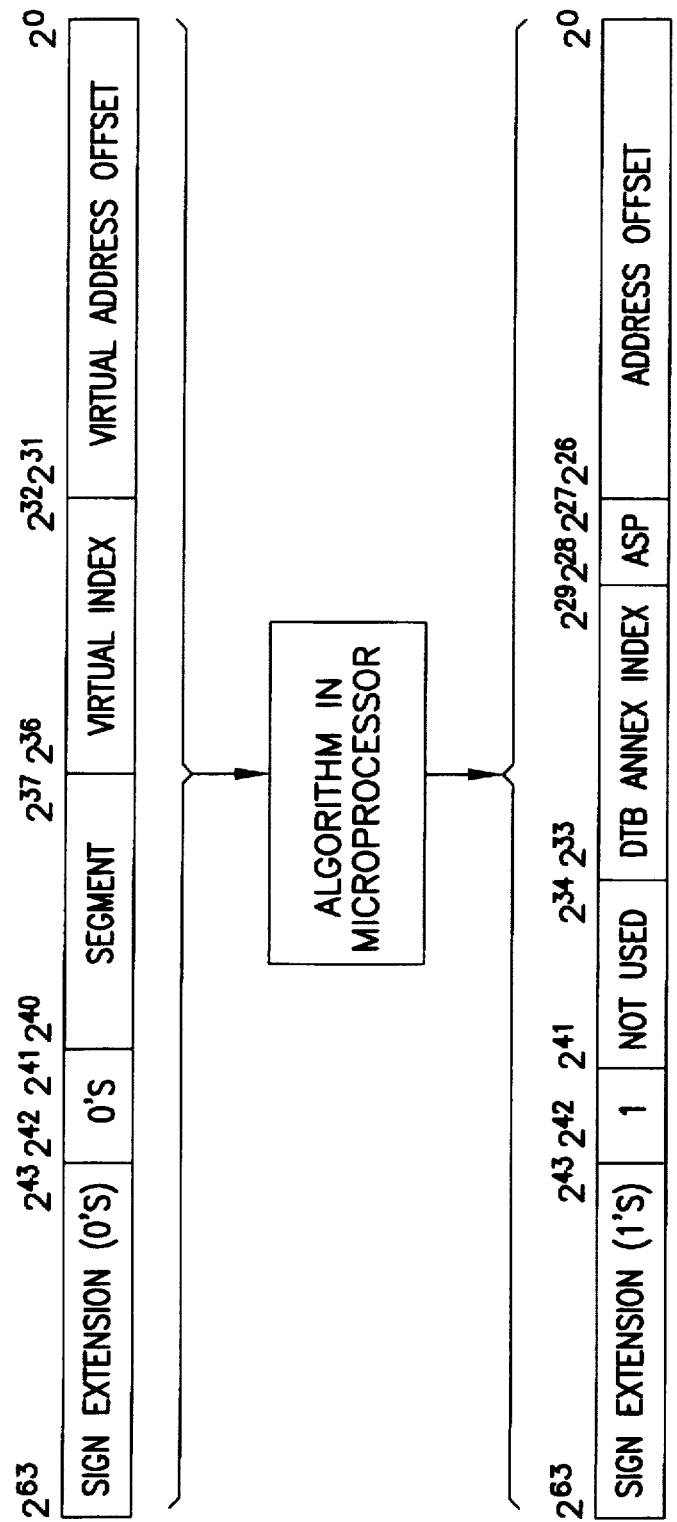
FIG. 7 is a diagram illustrating virtual to partial physical address conversion.

FIG. 7 shows how a microprocessor maps a virtual address into a partial physical address.

The partial physical address contains three parts: the DTB annex index, the address space partition (ASP), and the address offset. Bits 34 through 63 of the partial physical address are not placed on output pins of the microprocessor and are not used.

DTB Annex Index

Figure 8:
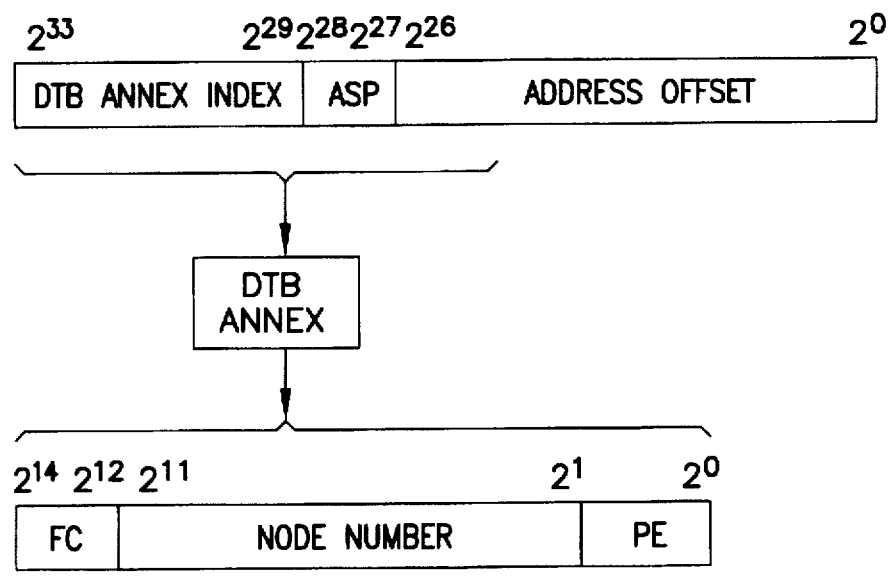
FIG. 8 is a diagram illustrating the function of the DTB annex.

The DTB annex index is a 5-bit number that references one of the 32 entries in the physical DTB annex (refer to FIG. 8).

After receiving the DTB annex index from the microprocessor, the DTB annex sends the contents of the appropriate DTB annex entry to the PE support circuitry. The support circuitry then interprets the DTB annex information to determine what type of memory function to perform and where to perform the memory function.

When bit 1 or bit 0 of the system control register is set to 1, the corresponding entries of the DTB annex may be written to by the user or the operating system. In this case, the support circuitry interprets the entries of the DTB annex virtual PE numbers and function codes.

When bit 1 or 0 of the control register is set to 0, the corresponding entries of the DTB annex may not be written. In this case, the support circuitry interprets the entries of the DTB annex as logical PE numbers and function codes.

The support circuitry always interprets entry 0 of the DTB annex as a logical PE number and a function code that is defined by the operating system.

Address Space Partition Bits

Figure 9:
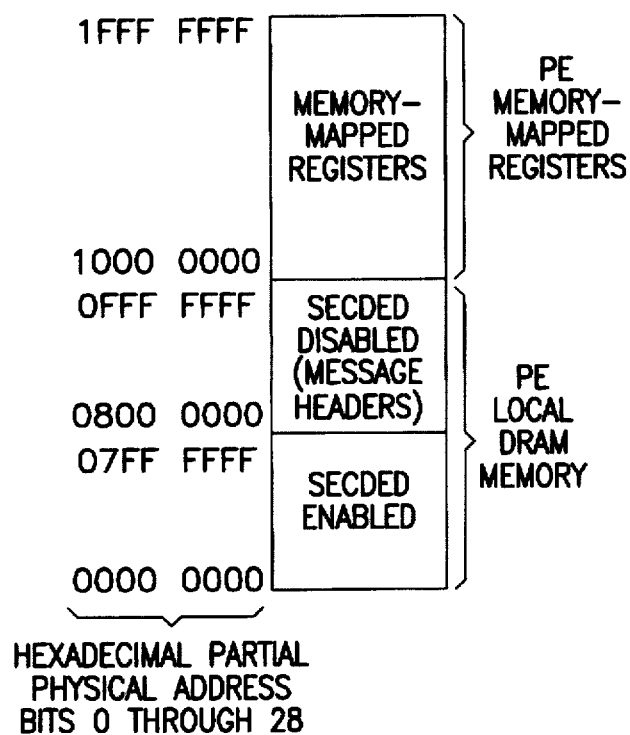
FIG. 9 is a diagram illustrating partial physical address space.

The address space partition bits divide the address space for bits 0 through 28 of the partial physical address into three regions (refer to Table 9). Bit 28 divides the partial physical address space into local memory and memory-mapped register space. Bit 27 further divides the local memory space into local memory with SECDED protection and local memory without SECDED protection. FIG. 9 shows a map of the partial physical address space for a PE.

The address space for local memory with SECDED protection provides up to 128 Mbytes (16 Mwords) of memory; however, not all of the address space is used. For example, MPP systems with local memory sizes of 2 Mwords (16 Mbytes) per PE use only the 23 least significant bits of the address offset. The 16 Mwords of address space is provided for future expansion of system memory.

The address space for local memory without SECDED protection provides up to 16 Mwords of memory; however, not all of this address space is used. The information stored in this section of local memory address space is from the headers of messages.

The address space for memory-mapped registers contains the addresses for information that is stored or read from memory-mapped registers. Memory mapped-registers are registers that are located in the support circuitry of a PE or other components of a PE node but are addressed by the local microprocessor as if they were located in a local memory.

For example, when the microprocessor stores information in a register that controls the block transfer engine, the microprocessor performs a write operation to the address that points to the block transfer engine register. More information on the block transfer engine is described in copending commonly assigned U.S. patent application for "System and Method of Addressing Distributed Memory Within a Massively Parallel Processing System", filed Dec. 10, 1993, to Oberlin et al., which is incorporated herein by reference. After receiving the data and address information, the support circuitry in the PE routes the data to the appropriate register instead of storing the information in local DRAM memory.

The address offset is a byte oriented address that points to a byte in the local memory of a PE; however, the support circuitry in the PE may not use the last 2 bits of the address offset portion of the partial physical address.

The support circuitry interprets bits 3 through 26 of the address offset as a word oriented address that points to a 64-bit word in the local memory of a PE. Because the support circuitry may only use bits 3 through 26 of the address offset, the term "address offset" also refers to a 24-bit address offset that references a 64-bit word in local memory.

When the address offset is larger than the maximum address offset for the size of local memory in a system, an Address Range Error occurs.

PE Support Circuitry Address Interpretation

When the microprocessor requests that a memory function be performed, the microprocessor and DTB annex present the support circuitry with address information. The support circuitry may interpret this information as an address for a virtual PE or as an address for a logical PE.

Virtual PE Address Interpretation

Figure 10:
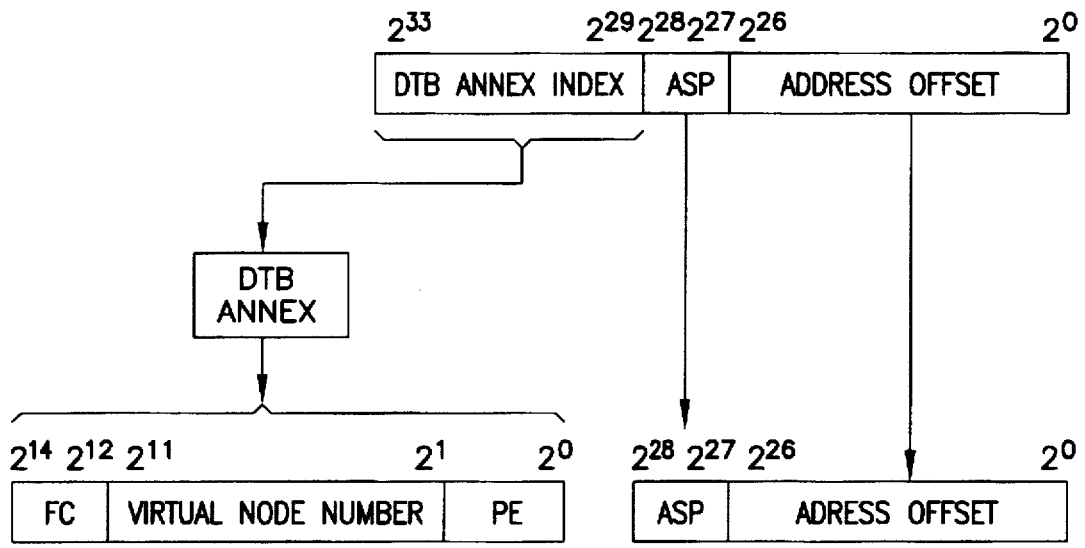
FIG. 10 is a diagram illustrating virtual PE address conversion.

When the entries of the DTB annex may be written to, the support circuitry interprets the address information as a virtual PE address. The support circuitry receives four types of information from the microprocessor and DTB annex: a memory function code, a virtual PE number, the ASP bits, and an address offset (refer to FIG. 10).

After receiving the virtual PE number from the DTB annex, the support circuitry compares the value of the virtual PE number to the value stored in a virtual PE (V_WHOAMI) register. The V_WHOAMI register contains the virtual PE number of the PE and is loaded by the operating system when the partitioning of the MPP system changes.

When the virtual PE number from the DTB annex matches the PE number stored in the V_WHOAMI register, the microprocessor is requesting that a memory function be performed in the local PE. After interpreting the function code bits that select which memory function to perform, the support circuitry transfers information between the microprocessor and local memory or between the microprocessor and a memory-mapped register (the location is specified by the ASP bits).

When the virtual PE number from the DTB annex does not match the PE number stored in the V_WHOAMI register, the microprocessor is requesting that a memory function be performed in a remote PE. When the microprocessor requests that a memory function be performed in a remote PE, the support circuitry checks the value of the virtual PE number to ensure that it is less than the highest numbered virtual PE in the hardware partition.

The support circuitry checks the value of the virtual PE number it received from the DTB annex by comparing the PE number to the virtual PE range mask stored in the virtual PE range mask (VRT_RG) register. This register is loaded by the operating system when the partitioning of the MPP system changes. Bit 0 of the VRT_RG register is not used. Bits 1 through 10 of the VRT_RG register contain a contiguous field of 0's in the legal bit positions for the size of the user partition and the remaining bits are set to 1's (refer to Table 10).

When the same bit of the virtual PE number and the virtual PE range mask is set to 1 (logical AND function), a virtual PE range error occurs.

After checking the value of the virtual PE number, the support circuitry in the PE sends address and control information to the network interface. The network interface uses this information to create packets.

Logical PE Address Interpretation

Figure 11:
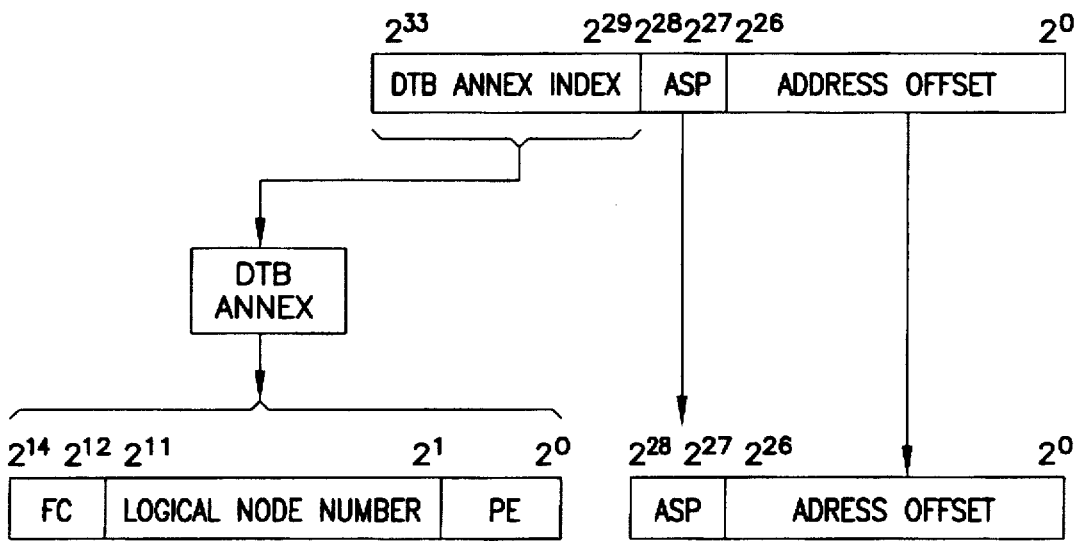
FIG. 11 is a diagram illustrating logical PE address conversion.

When the entries of the DTB annex may not be written to, the support circuitry interprets the address information as a logical PE address. The support circuitry receives four types of information from the microprocessor and DTB annex: a memory function code, a logical PE number, the ASP bits, and an address offset (refer to FIG. 11).

After receiving the logical PE number from the DTB annex, the support circuitry compares the value of the logical PE number to the value stored in a logical PE (L_WHOAMI) register. The L_WHOAMI register contains the logical PE number of the PE and is loaded by the operating system when the MPP system is initialized.

When the logical PE number from the DTB annex matches the PE number stored in the L_WHOAMI register, the microprocessor is requesting that a memory function be performed in the local PE. After interpreting the function code bits that select which memory function to perform, the support circuitry transfers information between the microprocessor and local memory or between the microprocessor and a memory-mapped register (the location is specified by the ASP bits).

When the logical PE number from the DTB annex does not match the PE number stored in the L_WHOAMI register, the microprocessor is requesting that a memory function be performed in a remote PE. When this occurs, the support circuitry in the PE does not perform a range check on the logical PE number. The support circuitry sends address and control information directly to the network interface for use in a packet.

Network Interface Address Interpretation

Figure 12:
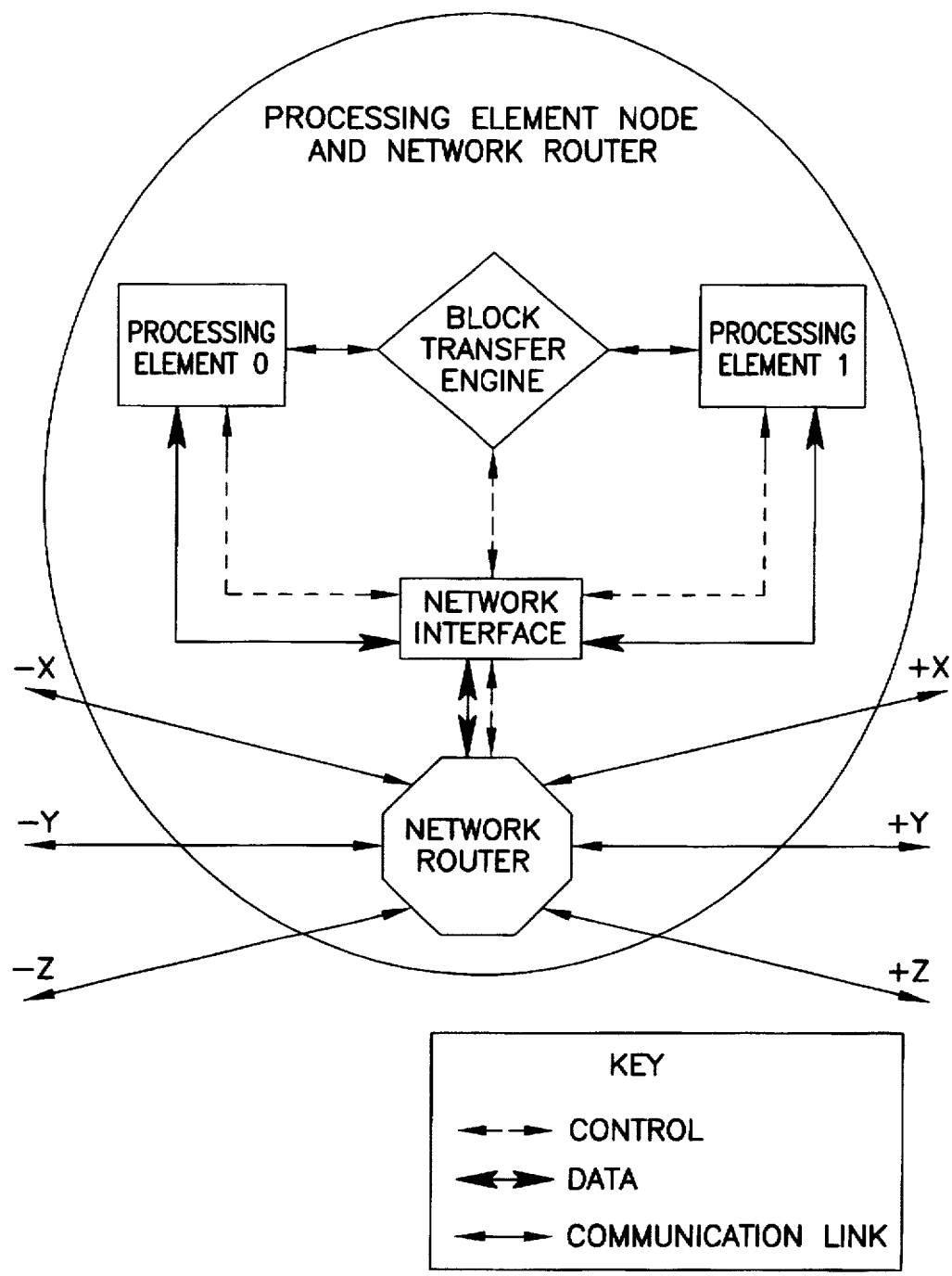
FIG. 12 is a diagram showing network interface connections.

The network interface receives address information and data from PE 0, PE 1, or the block transfer engine in a processing element node (refer to FIG. 12). The address information may be virtual PE address information or logical PE address information. When the information is virtual PE address information, the network interface must convert the virtual PE information into logical PE information before using the information to create a packet.

Converting a Virtual PE Number Into a Logical PE Number

As was shown in FIG. 5, the virtual PE number may correspond to different logical PE numbers. Because of this characteristic, the network interface cannot directly use a virtual PE number to determine which logical PE a memory function will be directed. The network interface must convert the virtual PE number into a corresponding logical PE number.

Figure 13:
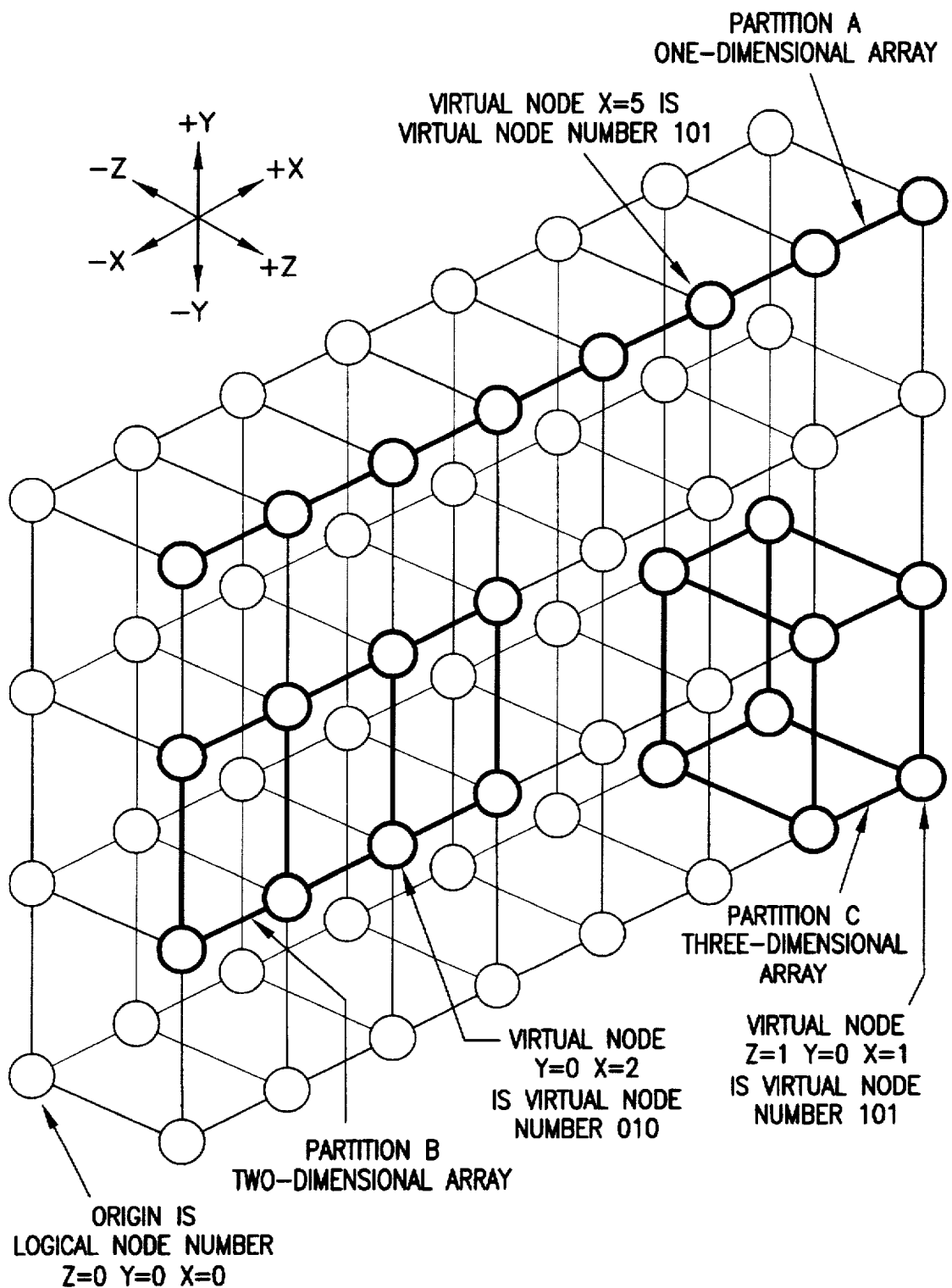
FIG. 13 is a diagram illustrating three 8-node partition shapes and virtual node numbers.

For example, FIG. 13 shows three 8-node partitions (partitions A, B, and C) in a 128-PE MPP system. In each partition, a virtual PE number refers to a PE in the partition. the virtual PE number contains a virtual node number and PE bit. The virtual node number in all three partitions is a 3-bit number.

All 3 bits of the virtual node number for partition A are assigned to the X dimension (refer again to FIG. 13). In partition B, bits 0 and 1 of the virtual node number are assigned to the X dimension and bit 2 is assigned to the Y dimension. In partition C, bit 0 of the virtual node number is assigned to the X dimension, bit 1 is assigned to the Y dimension, and bit 2 is assigned to the Z dimension.

Figure 14:
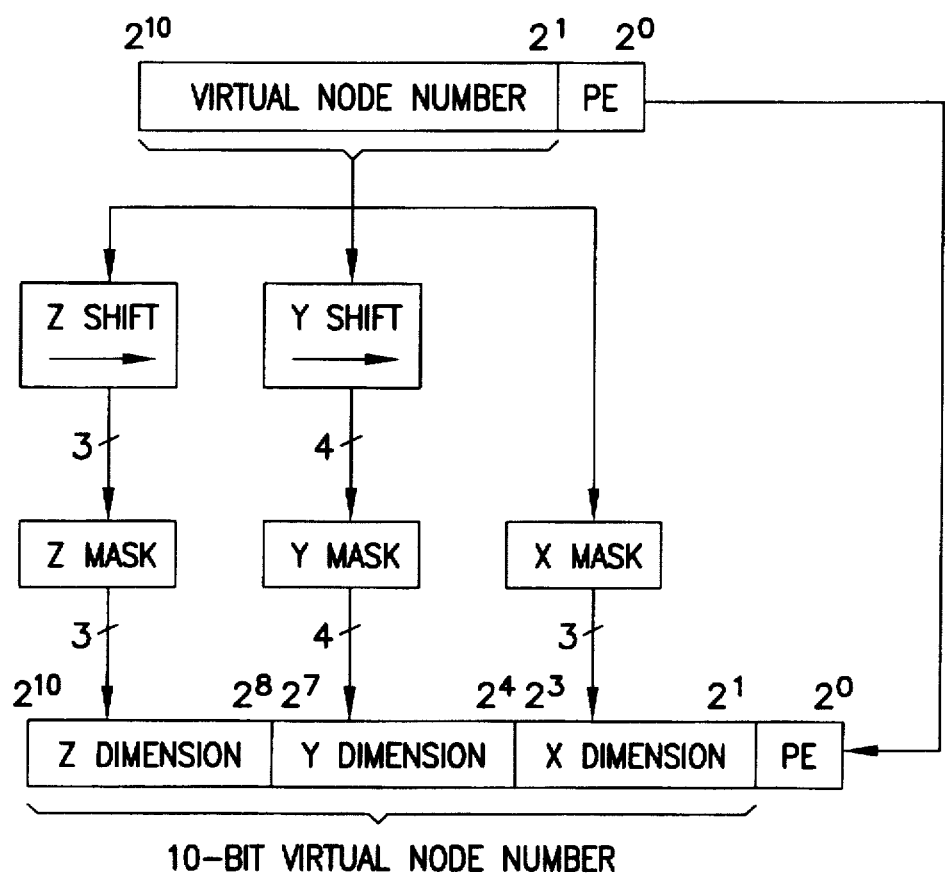
FIG. 14 is a diagram illustrating reformatting virtual node number to a 10-bit virtual node number.

The network interface uses a three-step process to convert the virtual PE number into a logical PE number. First, the network interface reformats the virtual node number (which may be a 1- to 1-bit number) into a 10-bit virtual node number (refer to FIG. 14).

The network interface compares the 3 least significant bits of the reformatted virtual node number to the X mask. The X mask is a contiguous, right-justified field of 1's that indicates how many bits of the virtual node number are assigned to the X dimension. When a bit in the X mask is set to 1, the corresponding bit of the virtual node number is valid. When a bit in the X mask is set to 0, the corresponding bit of the virtual node number is not used for the X dimension.

The network interface then shifts the reformatted virtual node number 0 to 3 bits to the right until the first bit that is assigned to the Y dimension is in the 0 bit location. The network interface compares the 4 least significant bits of the shifted virtual node number to the Y mask. When a bit in the Y mask is set to 1, the corresponding bit of the shifted virtual node number is valid. When a bit in the Y mask is set to 0, the corresponding bit of the shifted virtual node number is not used for the Y dimension.

The network interface then shifts the original reformatted virtual node number 0 to 7 bits to the right until the first bit that is assigned to the Z dimension is in the 0 bit location. The network interface compares the 3 least significant bits of the shifted virtual node number to the Z mask. When a bit in the Z mask is set to 1, the corresponding bit of the shifted virtual node number is valid. When a bit in the Z mask is set to 0, the corresponding bit of the shifted virtual node number is not used for the Z dimension.

Figure 15:
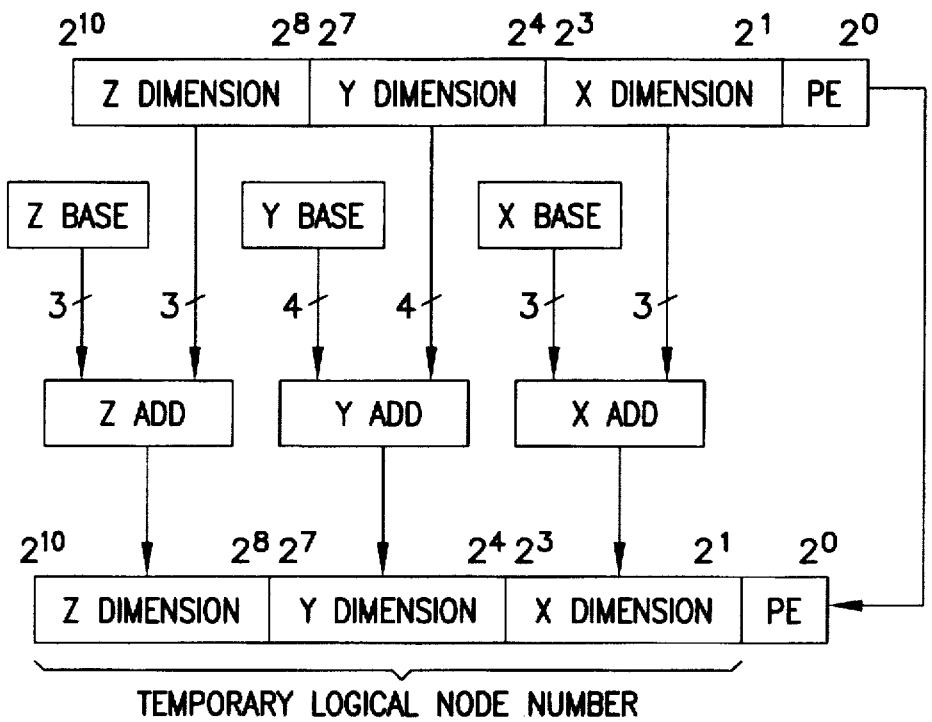
FIG. 15 is a diagram illustrating adding base node addresses.

After reformatting the virtual node number into a 10-bit virtual node number, the network interface adds a base node address to the 10-bit virtual node number (refer to FIG. 15).

The base node address is the logical node number of the smallest numbered virtual PE node in a partition. For example, Table 12 lists the base node addresses for the three partitions shown in FIG. 13. Table 12 also lists the shift and mask values for each partition.

Figure 16:
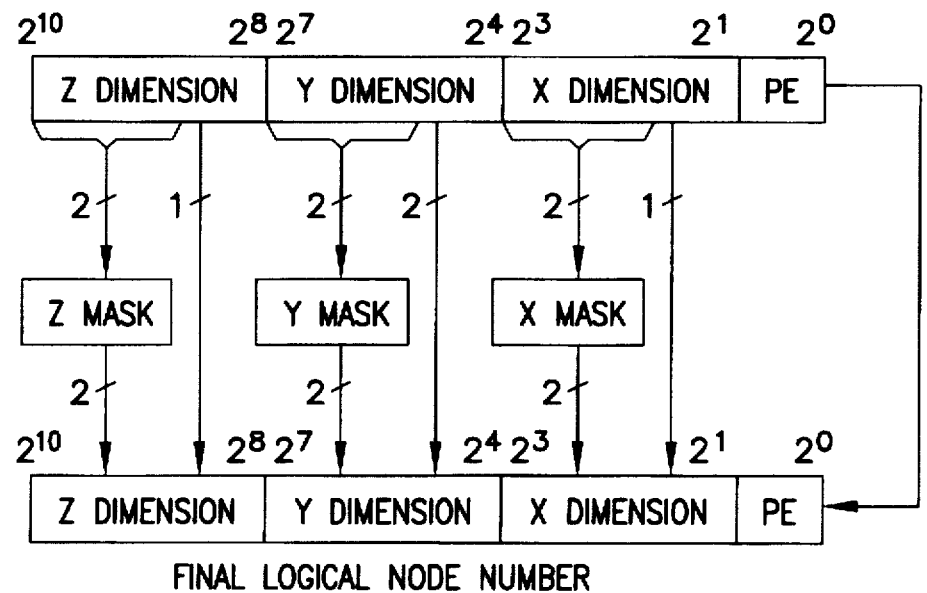
FIG. 16 is a diagram illustrating configuration masks.

After adding the base node address to the 10-bit virtual node number, the network interface compares the two most significant bits of the X, Y, and Z-dimension numbers to the X-, Y-, and Z-dimension configuration masks (refer to FIG. 16). When a bit of the X-, Y-,or Z-dimension configuration mask is set to 0, the corresponding bit in the X-, Y-, or Z-dimension number is valid. When a bit of the X-, Y-, or Z-dimension is set to 1, the corresponding bit in the X-, Y-, or Z-dimension number is set to 0.

Figure 17:
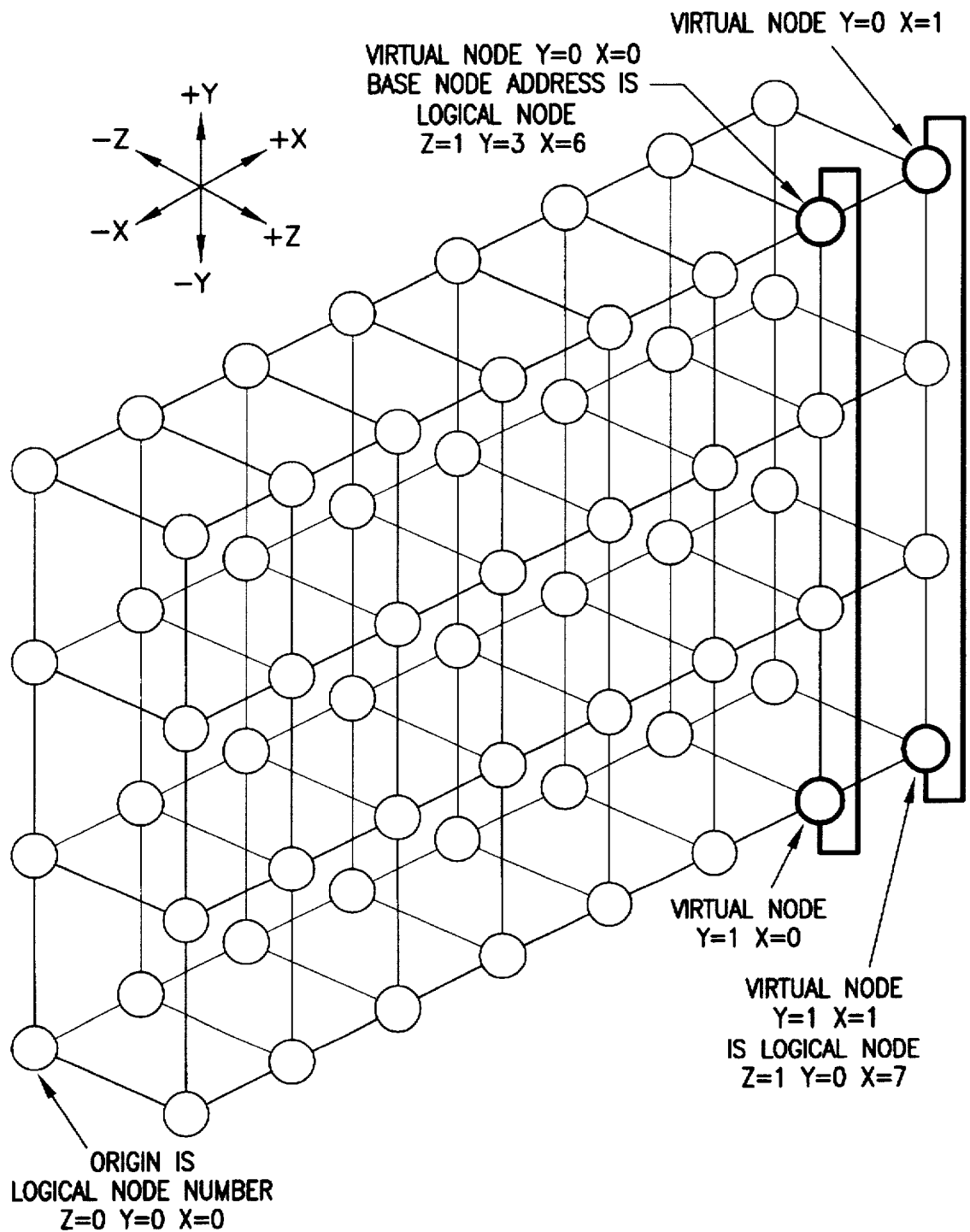
FIG. 17 is a diagram illustrating two dimensional 4-node partition and virtual node numbers.

The configuration masks prevent the final logical node number from becoming larger than the number of logical nodes in a system. For example, FIG. 17 shows a two-dimensional, four-node partition in a 128-PE MPP system. When the network interface converts the virtual node number 11 (Y=1 X=1) into a logical node number, the network interface first reformats the virtual node number into a 10-bit virtual node number.

After reformatting the virtual node number into a 10-bit virtual node number, the network interface adds the base node address to the virtual node number (refer to Table 11). In this example, the Y-dimension portion of the temporary logical node number is four. This value is larger than the largest numbered node in the Y dimension (refer again to FIG. 17).

The network interface then compares the temporary logical node number to the configuration masks to obtain the final logical node number of Z=1 Y=0 X=7 (refer again to Table 11 and FIG. 17). Fore more information on the configuration mask values for the different configurations of the MPP system, refer to "Register Mapping" in this section.

The base, shift, mask, and configuration mask values for all three dimensions are stored in a register called the network interface PE adjust (LPE_XLATE) register. This register is loaded by the operating system when the partitioning of the MPP system changes.

By changing the values of the base, shift, and mask numbers in the LPE_XLATE register, the operating system defines the partitions in the logical MPP system. More information on the LPE_XLATE register is provided in "Register Mapping" in this section.

Converting the Logical PE Number Into a Routing Tag

The network interface receives a logical PE number in one of two ways: directly from a PE or the BLT in the processing element node, or by converting a virtual PE number into a logical PE number. As was previously described, the logical PE number may not always correspond to the same physical PE in the MPP system.

The logical PE number contains two parts: the logical node number and the PE bit. Because the logical node number does not always correspond to the same physical node, the network interface cannot use the logical node number to calculate how to route information to the correct physical node.

Figure 18:
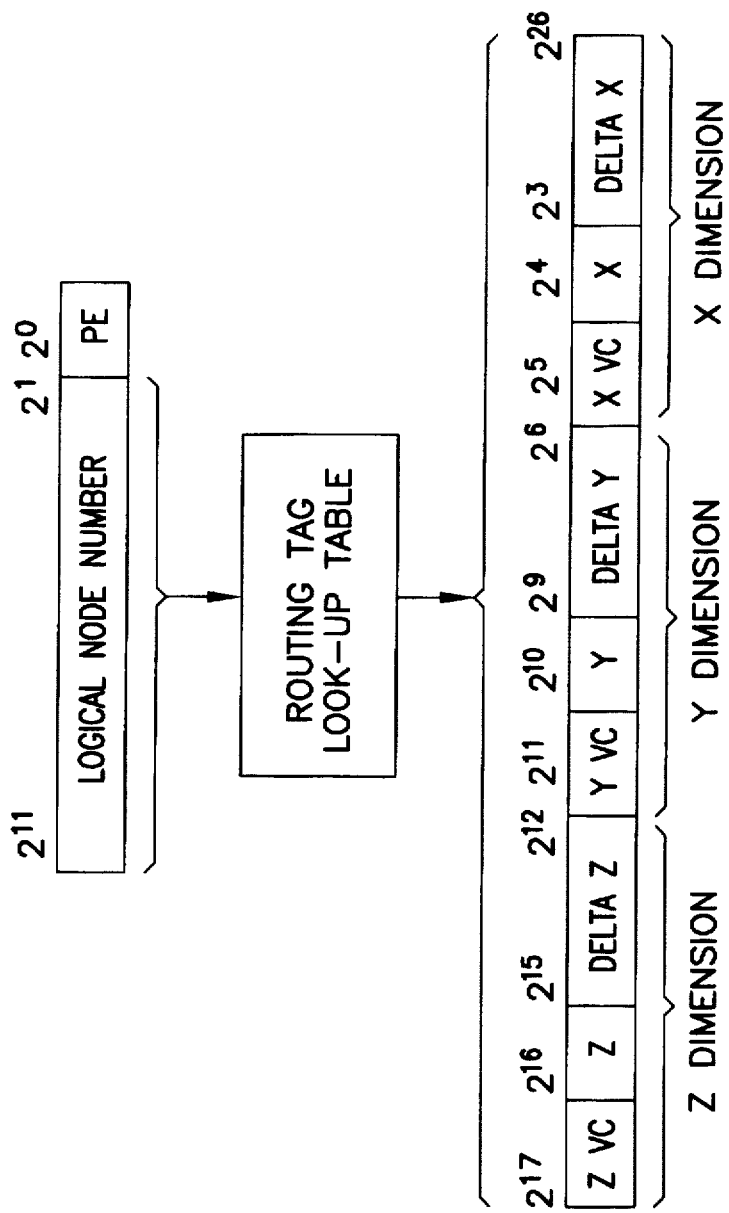
FIG. 18 is a diagram illustrating logical node number to routing tag conversion.

The network interface in each node uses a look-up table to obtain the routing tag. Circuitry in the network interface enters the logical node number into the routing tag look-up table. The routing tag look-up table then provides the routing tag that corresponds to that logical node (refer to FIG. 18).

The routing tag contains information that indicates the path a packet must follow through the interconnect network to get from the physical source node to the physical destination node. this information includes how many hops to complete in each dimension, what direction to travel in each dimension, and which virtual channel (VC) to use in each dimension.

Virtual channel signals are used to control which virtual channel the data will use. A virtual channel is created when request and response information transfers over the same physical communication link but is stored in separate buffers. The virtual channel signals include the virtual channel select bits and the virtual channel acknowledge bits.

These are two virtual channel select bits. These bits indicate which virtual channel buffer in the receiving node the information will be stored in. The below Table shows the definitions of the virtual channel select bits.

| Virtual Channel Select Bit Definitions | | | |
|---|---|---|---|
| MSB | LSB | Definition | Name |
| 0 | 0 | Request buffer 0 | Virtual channel 0 |
| 0 | 1 | Request buffer 1 | Virtual channel 1 |
| 1 | 0 | Response buffer 0 | Virtual channel 2 |
| 1 | 1 | Response buffer 1 | Virtual channel 3 |

The most significant bit of the virtual channel select bits indicates if the information on the Data signals is a request or a response. When set to 0, this bit indicates the information is a request. When set to 1, this bit indicates the information is a response. The least significant bit of the virtual channel select bit indicates which of the two request or two response buffers the information on the Data signals will be stored in. When set to 0, this bit indicates the information will be stored in buffer 0. When set to 1, this bit indicates the information will be stored in buffer 1.

These are four virtual channel acknowledge bits. Each virtual channel buffer controls one of the virtual channel acknowledge bits. For example, virtual channel buffer 2 controls bit $2^2$ of the virtual channel acknowledge bit. The node receiving information sets the appropriate virtual channel buffer and sends the information to another node of a PE.

The node resets the virtual channel acknowledge bit to 0 after the virtual channel is empty and the data has been sent to another node or a PE.

The routing tags for each node in the MPP system are generated by a program that runs in the host system. The routing tag calculation program uses a configuration file that contains information on each node and communication link in the MPP system.

When a communication link or node in the MPP system is not fully functional, the system administrator modifies the configuration file in the host system. The administrator then runs the routing tag calculation program. The program generates new routing tags that steer information around a bad node or communication link.

When the MPP system is booted, the routing tags are written into the routing tag look-up table of each node in the system. More information of the addresses and format of the routing tag look-up table is provided in "Register Mapping" in this section.

Creating a Packet

Figure 19:
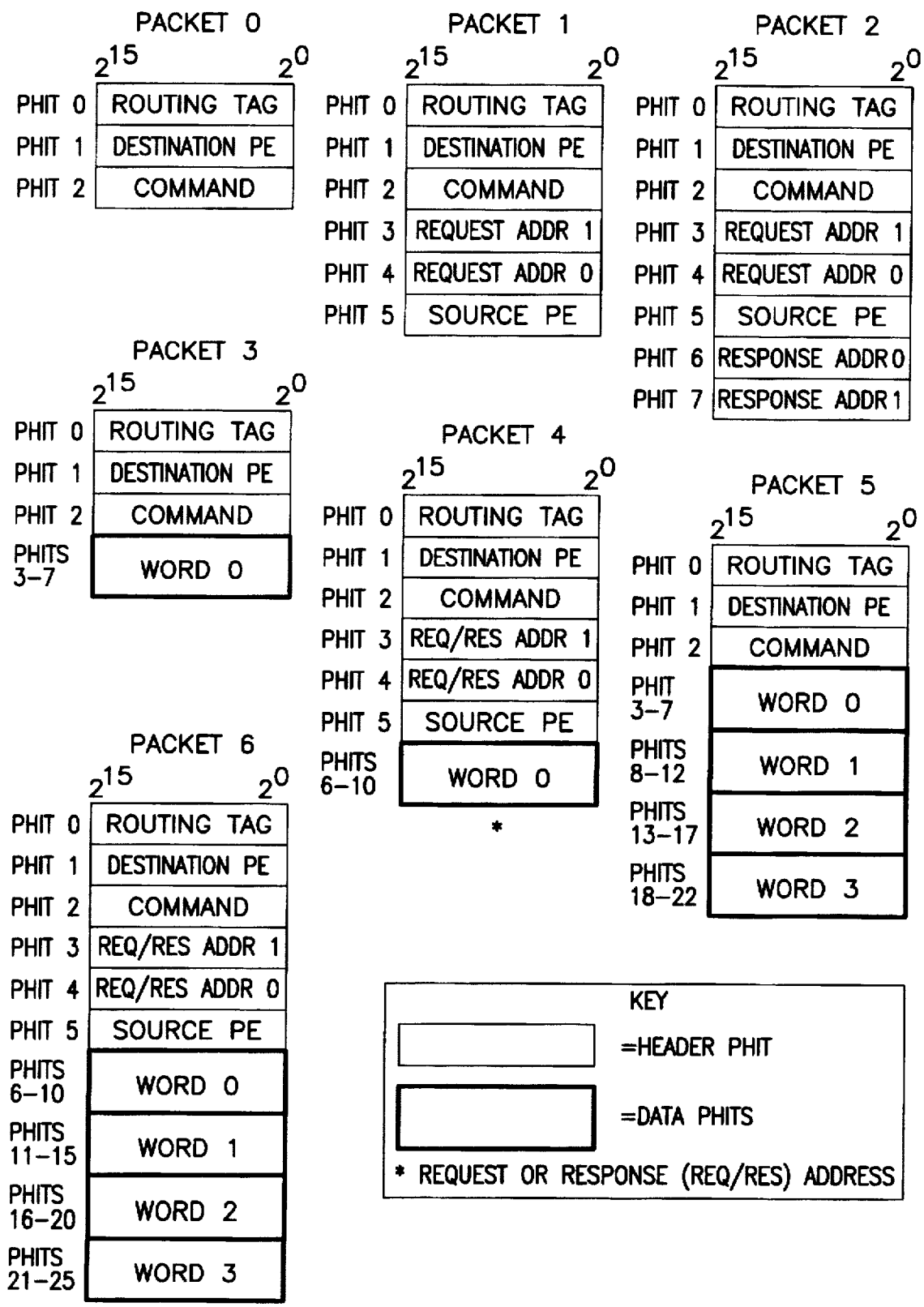
FIG. 19 is a diagram illustrating packet types.

The network interface generates information and uses the information it receives from a PE or the BLT to create packets. Table 13 lists the types of packets the network interface creates during various functions. FIG. 19 shows the format of each packet type. Each packet contains a header and may contain data. The following subsections describe each phit of the header and data portions of a packet.

Header

Every packet contains a header. The header may consist of the following types of phits: a routing tag phit, a destination phit, a command phit, request address phits, a source phit, or response address phits. The following paragraphs describe each type of phit.

Every packet contains a routing tag phit. After receiving the routing tag from the network interface, the X-dimension switch in the network router examines bits 0 through 3 of the routing tag. When bits 0 through 3 are equal to zero, the X-dimension switch sends the routing tag information to the Y-dimension switch in the network interface. As the X-dimension switch sends information to the Y-dimension switch, the bits of the routing tag are rearranged on the circuit board so that bits 0 through 3 contain the ΔY bits.

The bit format of the routing tag phit is rearranged on the circuit board each time information transfers between the X- and Y-dimension switches or between the Y- and Z-dimension switches in the network interface. The bits of the routing tag phit are rearranged so the same gate array types can be used for the X-, Y-, and Z-dimensions.

When bits 0 through 3 of the original routing tag are not equal to zero, the X-dimension switch checks the value of the ±X bit. This bit indicates when the packet should be sent on the +X or −X communication link. The X-dimension switch then checks the value of the X VC bit to determine which virtual channel to use on the communication link. (For more information about refer "Routing Tag Look-up Table Low-order Bits Registers" later in this section.) After checking the value of these two bits, the X-dimension switch increments the value of the ΔX portion of the routing tag phit by one and sends the phit to the network interface of the next node in the +X or −X direction. (The ΔX portion is incremented because it contains the two's compliment of the number of hops to complete in the X dimension.)

Every packet contains a destination phit. The destination phit contains the destination PE number (refer to Table 15). The destination PE number is the logical PE number of the PE that will receive the packet. The network interface obtains the destination PE number from bits 0 through 11 of the destination logical PE number that was read from the DTB annex or that was converted from the virtual PE number read from the DTB annex.

Every packet also contains a command phit with information that indicates to the destination PE what type of function to perform. The network interface formats the command information after it receives the information from the support circuitry in a PE or BLT.

Bits 0 through 11 of the command phit contain a command field (refer to Table 16). Bit 12 indicates when the packet will go to PE 0 or PE 1 in the destination PE node. bits 13 and 14 of the command phit contain an even parity bit for bits 8 through 12 and 0 through 7, respectively. When set to 1, bit 15 indicates the packet is an error message created by the network interface from an incorrectly routed packet.

The command field contains three parts: a packet type field, a request or response bit, and a command (refer to Table 17). The packet type field indicates what type of packet the command phit is in (refer again to FIG. 19). When set to 1, the request or response bit indicates the packet is a request packet. When set to 0, the request or response bit indicates the packet is a response packet. The command indicates what function to perform.

All the phits in a packet, except the routing tag, destination, and data phits, are protected by parity bits. As the network interface receives each phit of a packet (except the routing tag, destination, and data phits), the network interface generates 2 new parity bits.

When the new parity bits are not the same as the parity bits in the phit, an error occurred during the transfer. The network interface then sets bit 1 of the system status register (SSR) to 1, converts the packet into an error message, and sends the error message to PE 0 or PE 1 (identified in the command phit).

Only request packets contain request address phits. The request address points to one 64-bit word or the first word in a 4-word block of data in the memory of a PE. The network interface obtains the request address from the address offset generated by a PE or the BLT. Table 18 shows the format of the request address phits.

The BLT error bit (bit 12) is used to indicate one of three BLT errors in request packet types 4 or 6. When the BLT issues a write request (packet type 4 or 6) and the BLT error bit is set to 1, the BLT aborts the transfer.

Every request packet also contains a source phit. The source phit contains the source node number, which is the logical node number of the node creating the request packet. The source phit also contains a PE bit that indicates which PE in the source node created the packet. Table 19 shows the format of the source phit.

The node that receives the request packet uses the source node number as the destination node number in a response packet. The network interface generates the source node number by reading the node number stored in a register called the network interface source (X_WHOAMI) register.

The network interface also uses the X_WHOAMI register to check if a packet was routed to the correct node. After receiving a packet, the network interface compares the node number stored in the X_WHOAMI register with the destination node number in the packet. When the numbers are equal, the packet arrived at the correct destination node. When the numbers are not equal, an error occurred and the packet arrived at the wrong node.

When the network interface receives a packet that was supposed to transfer to another node, hardware in the network interface sets bit 1 (network packet error bit) of the system status register to indicate that a packet misrouted.

The network interface then converts the packet into an error message and sends the message to PE 0 or PE 1 in the node that received the packet (according to the PE bit that is stored in the command field of the packet). The microprocessor can then examine the message to try and determine the cause of the error.

A request or response packet may also contain a response address. The response address points to a location in local memory of the source PE where 1 word or 4 words of data from a read response packet will be stored. Table 20 shows the format of the response address phits.

The BLT error bit (bit 12) is used to indicate a BLT range error in request packet type 2 or response packet type 4 or 6. When the BLT issues a read request (packet type 2) and the BLT error bit is set to 1 in response address phit 0, the PE that receives the packet performs the memory read and creates a response packet type 4 or 6. The PE also sets the BLT error bit to 1 in response address phit 0 of the response packet. The PE that receives the response packet then does not perform the memory write.

Data

Figure 20:
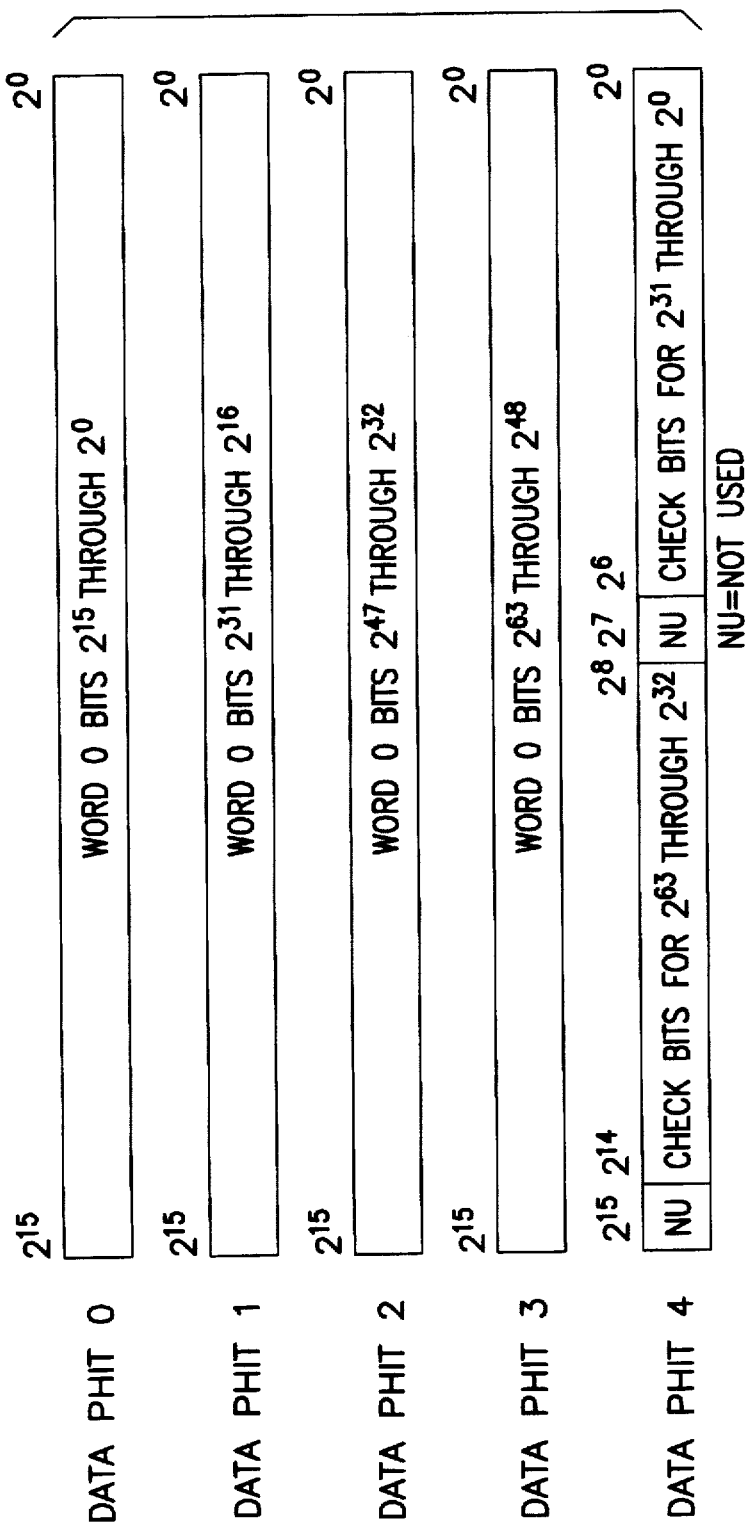
FIG. 20 is a diagram illustrating data phits.

Both request and response packets may contain data. Data is one 64-bit word or four 64-bit words that will be used by the PE receiving the packet. The network interface receives data for a packet from a PE in the processing element node. Seven check bits (used by the microprocessor to check the data for errors) are sent along with each 32-bit halfword. FIG. 20 shows the format of the data phits for word 0 in a packet.

Register Mapping

The MPP system uses several memory-mapped registers when interpreting addressing information. These registers are used to identify where a PE is located, check the value of virtual and logical PE numbers, and create the routing tag.

The following subsections describe the addressing and bit assignments for the memory-mapped registers (hereafter referred to as registers) used for addressing in the MPP system. Each subsection also provides a brief summary of the function of the register.

Table 21 is a summary of the registers and their names. Table 6–8 also lists the partial physical address of each register as they appear on the address pins of the microprocessor.

NOTE: Because of multiplexed data paths, when one PE in a processing element node is modifying the contents of the X_WHOAMI, the LPE_XLATE, a ROUTE_LO, or a ROUTE_HI register, the other PE in the node must not attempt to modify any of the shared registers at the same time. The shared registers include the X_WHOAMI, LPE_XLATE, ROUTE_LO, ROUTE_HI, NET_ENA, NET_PFM, NOED_CSR, and BLT registers.

Because the virtual address is defined by software, the addresses for each of the registers are given according to the partial physical address as they appear on the pins of the microprocessor.

Physical PE Number Register Address x 10400000

The physical PE number register (P_WHOAMI) is a 12-bit, read-only, system privileged register that contains the physical PE number. The physical PE number is a unique number assigned to each PE in the system and indicates where the PE is physically located in a system cabinet.

Table 22 shows the bit assignments for the P_WHOAMI register address as they appear on the address pins of the microprocessor.

The operating system uses the values stored in the P_WHOAMI registers to load the logical PE number registers of the MPP system when the system is deadstarted. This provides a unique temporary logical PE number for each physical PE in the system and allows the operating system to transfer deadstart information to all the PEs in the system. After the system is deadstarted, the logical PE number registers are loaded with the appropriate logical PE numbers.

There are two module types in the MPP system that contain PEs: processing element modules (PEMs) and input/output modules (IOMs). PEMs contain two printed circuit boards. Each printed circuit board contains two processing element nodes. Each input node or output node contains one PE.

When a PEM or an IOM is inserted into the MPP cabinet, hardware on the module and signals from the cabinet wire mat set the value of the bits in the P_WHOAMI register. These values indicate where the PE is located in the system hardware.

Table 23 shows the bit format of the P_WHOAMI register, and the following subsections describe each bit of the register.

PE Number Bit 0

The PE number bit indicates whether the PE is PE 0 or PE 1 in a processing element node. When set to 1, the PE is PE 1; and when set to 0, the PE is PE 0. When the PE is in an input node or an output node, this bit is set to 0.

X Coordinate bits 1 through 3

These bits indicate the X-dimension portion of the physical node number. The X-dimension number ranges from 0 through 7.

Node Number Bit 4

The node number bit indicates which node on a printed circuit board the PE resides in. On a processing element printed circuit board, this bit indicates whether the PE resides in processing element node 0 or processing element node 1. On an I/O gateway printed circuit board, this bit indicates whether the PE resides in the input node (node 0) or output node (node 1).

Printed Circuit Board Number Bit 5

This bit indicates which printed circuit board on a PEM or an IOM the PE resides. The printed circuit boards are also referred to as board A(0) and board B(1).

Chassis ID Bits 6 and 7

The chassis ID bits indicate which cabinet in a multiple cabinet configuration the PEM or IOM resides.

Z Coordinate Bits 8 through 10

The Z coordinate bits are set to different values depending on which type of module the PE resides. These modules are the standard PEM, the spare PEM, and the IOM.

When the PE is on a standard PEM, these bits indicate the Z-dimension portion of the physical node number. The Z-dimension number ranges from 0 through 7.

When the PE is on a spare PEM, the Z-coordinate bits are set to one (001). The I/O or spare PE bit is also set to 1. This sets the total Z-dimension and I/O or spare PE bit portion of the physical PE number to nine (1001).

When the PE is on an IOM, Z-coordinate bits 8 and 9 are both set to 0. Bit 10 should always be set to 1 in an IOM.

I/O or Spare PE Bit 11

When set to 1, this bit indicates that the PE resides on a spare PEM or an IOM. When the PE resides on a spare PEM, the Z-coordinate bits are set to one (001). When the PE resides on an IOM, the Z-coordinate bits are set to four (100).

Logical PE Number Register Address x10450000

The logical PE number register (L_WHOAMI) is a 12-bit, write-only, system privileged register that contains the logical PE number. The logical PE number is a unique number that is assigned by the operating system to each physical PE used in the logical MPP system. The support circuitry uses the L_WHOAMI register to check whether a memory function is to be performed in the local PE or a remote PE.

Table 24 shows the bit assignments for the L_WHOAMI register address as they appear on the address pins of the microprocessor.

Table 25 shows the bit format of the L_WHOAMI register and describes each bit in the register.

Virtual PE Number Register Address x10454000

The virtual PE number register (V_WHOAMI), is an 11-bit, write-only, system privileged register that contains the virtual PE number. The virtual PE number is a number assigned by the operating system to a logical PE in a partition. The support circuitry uses the V_WHOAMI register to check whether a memory function is to be performed in the local PE or a remote PE.

Table 26 shows the bit assignments for the V_WHOAMI register address as they appear on the address pins of the microprocessor.

Table 27 shows the bit format of the V-WHOAMI register and describes each bit in the register.

Virtual PE Range Mask Register Address x104580000

THe virtual PE range mask register (VRT_RG) is a 10-bit, write-only, system privileged register that contains the virtual PE range mask. The virtual PE range mask contains a contiguous field of 0's in the legal bit positions for the size of the user partition. The remaining bits are set to 1's.

Table 28 shows the bit assignments for the VRT_RG register address as they appear on the address pins of the microprocessor.

Table 29 shows the bit format of the VRT-RG register and describes each bit. For examples of virtual range masks, refer again to Table 10.

Network Interface Source Register Address x106A0000

The network interface source register (X_WHOAMI) is an 11-bit, write-only, system privileged register that contains the source logical node number. The network interface uses the source logical node number to indicate which logical node created a packet (source phit).

Table 30 shows the bit assignments for the X_WHOAMI register address as they appear on the address pins of the microprocessor.

Table 31 shows the bit format of the X-WHOAMI register and describes each bit register.

The network interface also uses the X_WHOAMI register to check the value of the destination logical node number in a packet header. After receiving a packet, the network interface compares the node number stored in the X_WHOAMI register with the destination node number in the packet. When the numbers are equal, the packet arrived at the correct destination node. When the numbers are not equal, a network packet error occurred and the packet arrived at the wrong node.

Network Interface PE Adjust Register Address x106B0000

The network interface PE adjust register (LPE_XLATE) is a 31-bit, write-only, system privileged register. The network interface PE adjust register contains the shift, base, mask, and configuration mask values used to translate a virtual node number into a logical node number (refer again to FIGS. 13–16).

Table 32 shows the bit assignments for the LPE_XLATE register address as they appear on the address pins of the microprocessor.

Table 41 shows the bit format of the LPE_XLATE register and describes each bit of the register. Table 39 lists the values of the configuration masks for each configuration of the MPP system.

Routing Tag Look-Up Table Low Order Bits Registers Address x1-6F0000

The routing tag look-up table low-order bits registers (ROUTE_LO) are 12-bit, write-only, system privileged registers that each contain the 12 low-order bits of a routing tag. Table 40 shows the bit assignments for a ROUTE_LO register address as they appear on the address pins of the microprocessor.

Bits 5 through 15 of the address indicate one of the 2,048 ROUTE_LO registers. Each ROUTE_LO register corresponds to one destination logical node number. For example, the address for the ROUTE_LO register that corresponds to the destination logical node number Z=1, Y=5, X=2 has bits 5 through 15 set to 15=0 (I/O bit), 14 through 12=001 (Z dimension), 11 through 8=0101 (Y dimension), and bits 7 through 5 set to 010 (X dimension).

Figure 21:
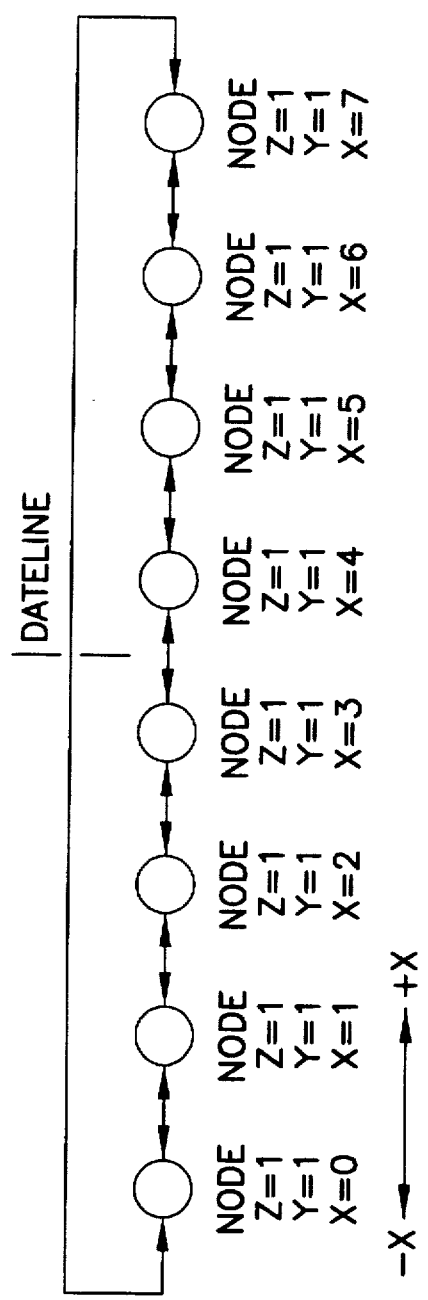
FIG. 21 is a diagram illustrating node dateline crossing.

Table 33 shows the bit format of each ROUTE_LO register and describes each bit in the register. FIG. 21 shows eight nodes in the X dimension of a MPP system. For clarity, the communication links that connect to the other nodes in the Z and Y dimensions are not shown. This figure is used as a reference for the following examples.

The following paragraphs provide examples of ROUTE_LO register values for the routing tag look-up table in node Z=1 Y=1 X=2 in FIG. 21. These examples assume the logical PE numbers are equal to the physical node numbers (no spare PE nodes are used). Also these examples assume that the dateline for the X dimension is the communication link that connects the smallest numbered node to the largest numbered node.

The value of the ROUTE_LO register for the destination node number Z=1, Y=1, X=4 is ΔX=E, ±X=0, X VC=0, ΔY=0, ±Y=0, Y VC=0. The ΔX value is set to $E_{16}$ because E is the two's compliment of 2. The packet will complete two hops in the X dimension to travel from node Z=1, Y=1, X=2 to node Z=1, Y=1, X=4. The ±X value is set to 0 because the packet will travel in the positive X direction. The X VC select bit 0 is set to 0 because the packet does not cross the dateline in the X dimension when it travels through the network.

The value of the ROUTE_LO register for the destination node number Z=1, Y=1, X=7, is ΔX=D, ±X=1, X VC=1, ΔY=0, ±Y=0, Y VC=0. The ΔX value is set to D because D is the two's compliment of 3. The packet will complete three hops in the X dimension to travel from node Z=1, Y=1, X=2 to node Z=1, Y=1, X=7. The ΔX value is set to 1 because the packet will travel in the negative X direction. The X VC select bit 0 is set to 1 because the packet does cross the dateline in the X dimension when it travels through the network.

The eight nodes shown in FIG. 21 do not connect to an I/O gateway, a spare processing element node, or both an I/O gateway and a spare processing element node, the routing tags must contain values that reflect the number of hops a packet makes when traveling through that dimension.

Figure 22:
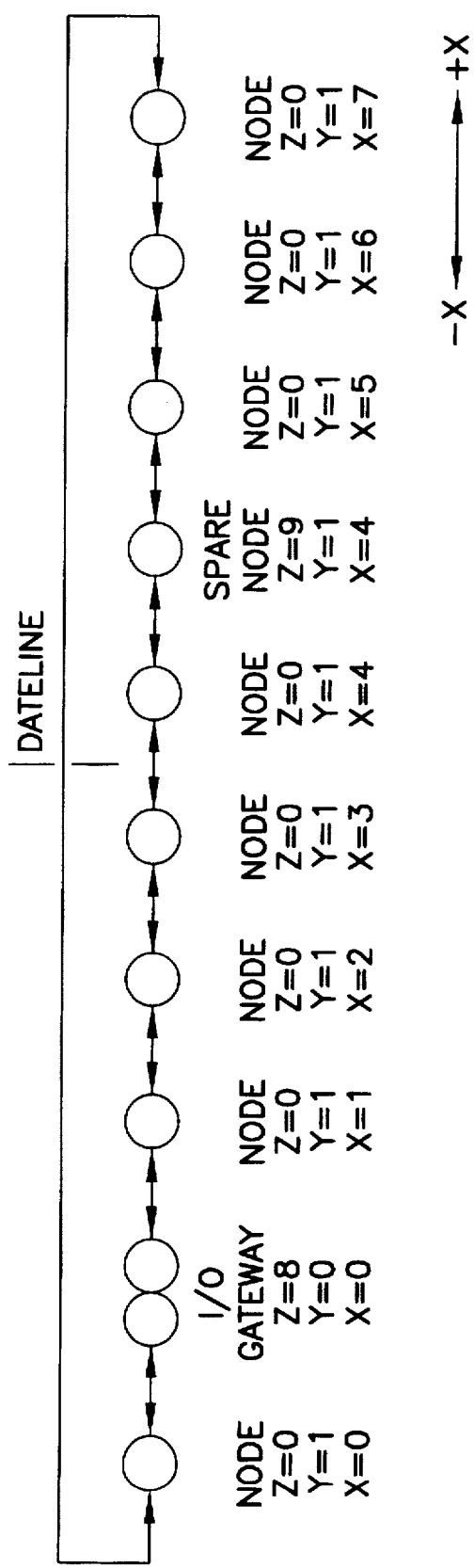
FIG. 22 is a diagram illustrating I/O gateway and spare PE node locations.

FIG. 22 shows eight processing element nodes, an I/O gateway, and a spare processing element node in the X-dimension of a MPP system. For clarity, the communication links that connect to the other nodes in the Z- and Y-dimensions are not shown.

The following paragraphs provide examples of ROUTE_LO register values for the routing tag look-up table in node Z=0, Y=1, X=3 in FIG. 22. These examples assume the logical PE numbers are equal to the physical node numbers (no spare processing element nodes are used). Also, these examples assume that the dateline for the X-dimension is the communication link that connects the smallest number node to the largest numbered node.

The value of the ROUTE_LO register for the destination node number Z=0, Y=1, X=0 is $\Delta X=B$, $\pm X=1$, X VC=0, $\Delta Y=0$, $\pm Y=0$, Y VC=0. The $\Delta X$ value is set to B because B is the two's compliment of 5. Because the I/O gateway contains two nodes (input node and output node) the packet will complete five hops in the X-dimension to travel from node Z=0, Y=1, X=3 to node Z=0, Y=1, X=0. The $\pm X$ value is set to 1 because the packet will travel in the negative X direction. The X VC select bit 0 is set to 0 because the packet does not cross the datelines in the X dimension when it travels through the network.

The value of ROUTE_LO register for the destination node number Z=0, Y=1, X=5 is $\Delta X=D$, $\pm X=0$, X VC=0, $\Delta Y=0$, $\pm Y=0$, U VC=0. The $\Delta X$ value is set to D because D is the two's compliment of 3. Because of the spare processing element node, the packet completes three hops in the X-dimension when traveling from node Z=0, Y=1, X=3 to node Z=0, Y=1, X=5. The _X value is set to 0 because the packet will travel in the positive X direction. The X VC select bit is set to 0 because the packet does not cross the dateline in the X-dimension when it travels through the network.

Routing Tag Look-Up Table High-Order Bits Register Address x1-7F0000

The routing tag look-up table high-order bits registers (ROUTE_HI) are 6-bit, write-only, system privileged registers that each contain the 6 high-order bits of a routing tag. Table 34 shows the bit assignments for a ROUTE_HI register address as they appear on the Address pins of the microprocessor.

Bits 5 through 15 of the address indicate one of the 2,048 ROUTE_HI registers. Each ROUTE_HI register corresponds to one destination logical node number. For example, when bits 5 through 15 of the address are set to 15=0 (I/O bit), 14 through 12=001 (Z dimension), 11 through 8=0101 (Y dimension), and bits 7 through 5 set to 010 (X dimension), the ROUTE_HI register corresponds to a destination logical node number of Z=1, Y=5, X=2.

Table 35 shows the bit format of each ROUTE_HI register and describes each bit of the register.

While the invention has been described by reference to tables, figures, and discussions of specific parameters such as PE and node numbering, network conventions, address and register fields, memory address conventions, bit and byte assignments and the like, it will be appreciated that such specifics are only by way of example, and not by way of limitation. As will be apparent to those skilled in the art from the foregoing specification, tables and figures, many different specific implementations are possible, within the scope of the invention.

Appendix A

| $2^{11}$ | $2^{10}$ ... $2^8$ | $2^7$ ... $2^4$ | $2^3$ ... $2^1$ | $2^0$ |
|---|---|---|---|---|
| I/O | Z Coordinate | Y Coordinate | X Coordinate | PE |

Physical Node Number

TABLE 1. Generalized PE Number Format

| $2^{11}$ | $2^{10}$ ... $2^8$ | $2^7$ ... $2^4$ | $2^3$ ... $2^1$ | $2^0$ |
|---|---|---|---|---|
| I/O | Z Coordinate | Y Coordinate | X Coordinate | PE |

Logical Node Number

TABLE 2. Logical PE number

| $2^{10}$ ... $2^8$ | $2^7$ ... $2^4$ | $2^3$ ... $2^1$ | $2^0$ |
|---|---|---|---|
| Z Coordinate | Y Coordinate | X Coordinate | PE |

TABLE 3. Virtual PE Number

Table 4. Eight-node Partition Shapes

| Eight-node Array Shaped in X, Y, Z | Description |
|---|---|
| 8, 1, 1 | One-dimensional array in the X dimension |
| 1, 8, 1 | One-dimensional array in the Y dimension |
| 1, 1, 8 | One-dimensional array in the Z dimension |
| 1, 2, 4 | Two-dimensional array in the Y-Z plane |
| 1, 4, 2 | Two-dimensional array in the Y-Z plane |
| 2, 1, 4 | Two-dimensional array in the X-Z plane |
| 4, 1, 2 | Two-dimensional array in the X-Z plane |
| 2, 4, 1 | Two-dimensional array in the X-Y plane |
| 4, 2, 1 | Two-dimensional array in the X-Y plane |
| 2, 2, 2 | Three-dimensional array |

| $2^{63}$ | $2^{43}\ 2^{42}\ 2^{41}\ 2^{40}$ | $2^{37}\ 2^{36}$ | $2^{32}\ 2^{31}$ | $2^0$ |
|---|---|---|---|---|
| Sign Extension (0's) | 0's | Segment | Virtual Index | Virtual Address Offset |

TABLE 5. Virtual Address Format

| $2^{14}$ | $2^{12}\ 2^{11}$ | $2^1\ 2^0$ |
|---|---|---|
| FC | Node Number | PE |

TABLE 6. DTB Annex Entry

Table 7. Memory Function Codes

| Function Code Bits 14 – 12 | Memory Function |
|---|---|
| 000 | Write or noncacheable read |
| 001 | Write or noncacheable atomic swap |
| 010 | Fetch-and-increment write or read |
| 011 | Reserved (may cause an error interrupt) |
| 100 | Write or cached read |
| 101 | Write or cached atomic swap |
| 110 | Write or cached read ahead |
| 111 | Message or cached read |

Table 8. Sample DTB Annex Entry Assignments

| Virtual Index | DTB Annex Function | Function Code | PE Number | Valid Segments | User Write Permission |
|---|---|---|---|---|---|
| 0 | System use | Not applicable | Not applicable (NA) | NA | No |
| 1 | Write or cached read | 100 | Local logical PE number | 1-6 | No |
| 2 | Write or read | 000 | Local logical PE number | 2-6 | No |
| 3 | Atomic swap | 001 | Local logical PE number | 2, 3, 5, 6 | No |
| 4 | Fetch and increment | 010 | Local logical PE number | 2, 3, 5, 6 | No |
| 5 | Cached atomic swap | 101 | Local logical PE number | 2, 3, 5, 6 | No |
| 6 | Message write (loopback) | 111 | Local logical PE number | 2, 3, 5, 6 | No |
| 7 | Reserved for future use | Reserved | Reserved for future use | Reserved | No |
| 8 – 15 | Reserved for future use | Reserved | Reserved for future use | Reserved | No |
| 16 – 31 | User defined | User defined | Virtual PE number | 5, 6 | Yes |

Table 9 Address Space Partition Bit Definitions

| ASP Bits 28 and 27 | Region |
|---|---|
| 00 | Local memory with SECDED protection |
| 01 | Local memory without SECDED protection |
| 10 | Memory-mapped register space |
| 11 | |

Table 10 Virtual PE Range Mask Values

| $2^{10}$ | $2^9$ | $2^8$ | $2^7$ | $2^6$ | $2^5$ | $2^4$ | $2^3$ | $2^2$ | $2^1$ | $2^0$ | Number of Nodes in Partition | Number of PEs in Partition |
|---|---|---|---|---|---|---|---|---|---|---|---|---|
| 1 | 1 | 1 | 1 | 1 | 1 | 1 | 1 | 1 | 1 | x | 1 | 2 |
| 1 | 1 | 1 | 1 | 1 | 1 | 1 | 1 | 1 | 0 | x | 2 | 4 |
| 1 | 1 | 1 | 1 | 1 | 1 | 1 | 1 | 0 | 0 | x | 4 | 8 |
| 1 | 1 | 1 | 1 | 1 | 1 | 1 | 0 | 0 | 0 | x | 8 | 16 |
| 1 | 1 | 1 | 1 | 1 | 1 | 0 | 0 | 0 | 0 | x | 16 | 32 |
| 1 | 1 | 1 | 1 | 1 | 0 | 0 | 0 | 0 | 0 | x | 32 | 64 |
| 1 | 1 | 1 | 1 | 0 | 0 | 0 | 0 | 0 | 0 | x | 64 | 128 |
| 1 | 1 | 1 | 0 | 0 | 0 | 0 | 0 | 0 | 0 | x | 128 | 256 |
| 1 | 1 | 0 | 0 | 0 | 0 | 0 | 0 | 0 | 0 | x | 256 | 512 |
| 1 | 0 | 0 | 0 | 0 | 0 | 0 | 0 | 0 | 0 | x | 512 | 1,024 |
| 0 | 0 | 0 | 0 | 0 | 0 | 0 | 0 | 0 | 0 | x | 1,024 | 2,048 |

```
      Z     Y     X
     000   0001  001    10-bit Virtual Node Number
  +  001   0011  110    Base Node Address
     ───────────────
     001   0100  111    Temporary Logical Node Number
      11    11    00    Configuration Masks
     ───────────────
     001   0000  111    Final Logical Node Number
```

TABLE 11. Configuration Mask Example

Table 12. Partitions A,B, and C Translation Parameters

| Partition | Parameter | Z Dimension | Y Dimension | X Dimension |
|---|---|---|---|---|
| A | Base | 1 | 3 | 0 |
| A | Shift | 0 | 0 | Not Applicable |
| A | Mask | 0000 | 0000 | 111 |
| B | Base | 1 | 1 | 0 |
| B | Shift | 0 | 2 | Not Applicable |
| B | Mask | 0000 | 0001 | 011 |
| C | Base | 0 | 0 | 6 |
| C | Shift | 2 | 1 | Not Applicable |
| C | Mask | 0001 | 0001 | 001 |

Table 13. Functions and Packet Types

| Function | Request Packet Type | Response Packet Type |
|---|---|---|
| PE generated noncacheable read | 1 | 3 |
| PE generated write (single-word body) | 4 | 0 |
| PE generated cached read | 1 | 5 |
| PE generated write (4-word body) | 6 | 0 |
| BLT generated single-word read | 2 | 4 |
| BLT generated single-word write | 4 | 0 |
| BLT generated block read | 2 | 6 |
| BLT generated block write | 6 | 0 |
| Prefetch read | 1 | 3 |
| Fetch-and-increment read | 1 | 3 |

Table 14. Functions and Packet Types (continued)

| Function | Request Packet Type | Response Packet Type |
|---|---|---|
| Fetch-and-Increment register write | 4 | 0 |
| Noncacheable atomic swap | 4 | 3 |

| $2^{15}$ | $2^{12}$ $2^{11}$ | $2^1$ $2^0$ |
|---|---|---|
| Not Used | Destination Logical Node Number | PE |

TABLE 15
Figure 6-25. Destination Phit

| $2^{15}$ | $2^{14}$ | $2^{13}$ | $2^{12}$ | $2^{11}$ | $2^0$ |
|---|---|---|---|---|---|
| Error | Parity | Parity | PE | Command | |

TABLE 16
Figure 6-26. Command Phit

| $2^{11}$ | $2^9$ | $2^8$ | $2^7$ | $2^0$ |
|---|---|---|---|---|
| Packet Type | RQ/RS | | Command | |

TABLE 17
Figure 6-27. Command Field

| | $2^{15}$ | $2^{14}$ | $2^{13}$ | $2^{12}$ | | | $2^0$ |
|---|---|---|---|---|---|---|---|
| Request Address Phit 1 | 0 | Parity | Parity | Address Offset Bits $2^{26}$ through $2^{14}$ | | | |

| | $2^{15}$ | $2^{14}$ | $2^{13}$ | $2^{12}$ | $2^{11}$ | $2^1$ | $2^0$ |
|---|---|---|---|---|---|---|---|
| Request Address Phit 0 | 0 | Parity | Parity | BLT | Address Offset Bits $2^{13}$ through $2^3$ | | NU |

NU = Not Used

TABLE 18
Figure 6-28. Request Address Phits

| | $2^{15}$ | $2^{14}$ | $2^{13}$ | $2^{12}$ | $2^{11}$ | | $2^1$ | $2^0$ |
|---|---|---|---|---|---|---|---|---|
| | 0 | Parity | Parity | NU | Source Logical Node Number | | | PE |

NU = Not Used

Table 19
Figure 6-29. Sources Phit

| | | $2^{15}$ | $2^{14}$ | $2^{13}$ | $2^{12}$ | | $2^0$ |
|---|---|---|---|---|---|---|---|
| Response Address Phit 1 | | 0 | Parity | Parity | Address Offset Bits $2^{26}$ through $2^{14}$ | | |

| | | $2^{15}$ | $2^{14}$ | $2^{13}$ | $2^{12}$ | $2^{11}$ | | $2^1$ | $2^0$ |
|---|---|---|---|---|---|---|---|---|---|
| Response Address Phit 0 | | 0 | Parity | Parity | BLT | Address Offset Bits $2^{13}$ through $2^3$ | | | NU |

NU = Not Used

Table 20
Figure 6-30. Response Address Phits

Table 21 Address Register

| Address | Register Name | Direction | Description |
|---|---|---|---|
| x10400000 | P_WHOAMI | Read | Physical PE number |
| x10450000 | L_WHOAMI | Write | Logical PE number |
| x10454000 | V_WHOAMI | Write | Virtual PE number |
| x10458000 | VRT_RG | Write | Virtual PE range |
| x106A0000 | X_WHOAMI | Write | Network interface source |
| x106B0000 | LPE_XLATE | Write | Network interface PE adjust |
| x106F0000 | ROUTE_LO | Write | Routing tag look-up table low order bits |
| x107F0000 | ROUTE_HI | Write | Routing tag look-up table high order bits |

| HEX | 1 | | | | | 0 | | | | 4 | | | | 0 | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
| | 1 | x | x | x | x | x | 1 | 0 | 0 | 0 | 0 | 0 | 0 | 0 | 0 | x | x | x | x | x | x | x | x | x | x | x | x | x | x | x = Don't Care

Table 22. P_WHOAMI Register Address Bit Assignments

Table 23. P_WHOAMI Register Format

| Bits | Name |
|---|---|
| 0 | PE number |
| 3 – 1 | X coordinate |
| 4 | Node number on the printed circuit board |
| 5 | Printed circuit board number on module |
| 7 – 6 | Chassis ID bits |
| 10 – 8 | Z coordinate |
| 11 | I/O or Spare PE |
| 63 – 12 | These bits are not used |

| HEX | 1 | | | | | 0 | | | | 4 | | | | 5 | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
| | 1 | x | x | x | x | x | 1 | 0 | 0 | 0 | 1 | 0 | 1 | 0 | 0 | x | x | x | x | x | x | x | x | x | x | x | x | x | x | x = Don't Care

Table 24. L_WHOAMI Register Address Bit Format

Table 25. L_WHOAMI Register Format

| Bits | Name | Description |
|---|---|---|
| 0 | PE number | This bit indicates whether the PE is PE 0 or PE 1 in the logical node. This bit is set to 0 when the PE is in an input or output node. |
| 3 – 1 | X coordinate | These bits contain the X-dimension portion of the logical node number. |
| 7 – 4 | Y coordinate | These bits contain the Y-dimension portion of the logical node number. |
| 10 – 8 | Z coordinate | These bits contain the Z-dimension portion of the logical node number. |
| 11 | I/O node | When set to 1, this bit indicates that the PE is in an input node or an output node. |
| 63 – 12 | Not used | These bits are not used. |

| HEX | 1 | | | | 0 | | | | 4 | | | | 5 | | | | 4 | | | | 0 | | | | 0 | | | | 0 | |
|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ | |
| | 1 | x | x | x | x | x | 1 | 0 | 0 | 0 | 1 | 0 | 1 | 0 | 1 | x | x | x | x | x | x | x | x | x | x | x | x | x | x | |

Table 26. V_WHOAMI Register Address Bit Format

Table 27. V_WHOAMI Register Format

| Bits | Name | Description |
|---|---|---|
| 0 | PE number | This bit indicates whether the PE is PE 0 or PE 1 in the virtual node. |
| 10 – 1 | Virtual node number | These bits contain the virtual node number. The virtual node number may range from 1 to 10 bits. |
| 63 – 11 | Not used | These bits are not used. |

| HEX | 1 | | | | | 0 | | | | 4 | | | | 5 | | | | 8 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ | | | | |
| | 1 | x | x | x | x | x | 1 | 0 | 0 | 0 | 1 | 0 | 1 | 1 | 0 | x | x | x | x | x | x | x | x | x | x | x | x | x | x | | | | | x = Don't Care

Table 28. VRT_RG Register Address Bit Assignments

Table 29. VRT_RG Register Format

| Bits | Name | Description |
|---|---|---|
| 0 | Not used | This bit is not used. |
| 10 – 1 | Virtual PE range mask | These bits contain the virtual PE range mask. |
| 63 – 11 | Not used | These bits are not used. |

| HEX | 1 | | | | | 0 | | | | 6 | | | | A | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^9$ | $2^8$ | $2^7$ | $2^6$ | $2^5$ | $2^4$ | $2^3$ | $2^2$ | $2^1$ | $2^0$ | | | | |
| | 1 | x | x | x | x | x | 1 | 1 | 0 | 1 | 0 | 1 | 0 | x | x | x | x | x | x | x | x | x | x | x | x | x | x | x | x | | | | |

Table 30. X_WHOAMI Register Address Bit Assignments

Table 31. X_WHOAMI Register Format

| Bits | Name | Description |
|---|---|---|
| 0 | Not used | This bit is not used. |
| 3 – 1 | X coordinate | These bits contain the X-dimension portion of the source logical node number. |
| 7 – 4 | Y coordinate | These bits contain the Y-dimension portion of the source logical node number. |
| 10 – 8 | Z coordinate | These bits contain the Z-dimension portion of the source logical node number. |
| 11 | I/O | When set to 1, this bit indicates that the source logical node is an input node or an output node. |
| 63 – 12 | Not used | These bits are not used. |

| HEX | 1 | | | | 0 | | | | 6 | | | | B | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ | | | |
| | 1 | x | x | x | x | x | 1 | 1 | 0 | 1 | 0 | 1 | 1 | x | x | x | x | x | x | x | x | x | x | x | x | x | x | x | x | | | |

Table 32. LPE_XLATE Register Address Bit Assignments

Table 33. ROUTE_LO Register Format

| Bits | Name | Description |
|---|---|---|
| 3 – 0 | ΔX | These bits contain the two's complement of the number of hops the packet will make in the X dimension. |
| 4 | ±X | When set to 0, this bit indicates the packet will travel in the +X direction. When set to 1, this bit indicates the packet will travel in the –X direction. |
| 5 | X VC select bit 0 | When set to 0, this bit indicates a request packet will use VC 0 and a response packet will use VC 2 in the X dimension. When set to 1, this bit indicates a request packet will use VC 1 and a response packet will use VC 3 in the X dimension. |
| 9 – 6 | ΔY | These bits contain the two's compliment of the number of hops the packet will make in the Y dimension. |
| 10 | ±Y | When set to 0, this bit indicates the packet will travel in the +Y direction. When set to 1, this bit indicates the packet will travel in the –Y direction. |
| 11 | Y VC select bit 0 | When set to 0, this bit indicates a request packet will use VC 0 and a response packet will use VC 2 in the Y dimension. When set to 1, this bit indicates a request packet will use VC 1 and a response packet will use VC 3 in the Y dimension. |
| 15 – 12 | Zero | These bits are not used and should be set to 0s. |
| 31 – 16 | Repeated data | Bits 31 through 16 must be set to the same value as bits 15 through 0. |
| 47 – 32 | Repeated data | Bits 47 through 32 must be set to the same value as bits 15 through 0. |
| 63 – 48 | Repeated data | Bits 63 through 48 must be set to the same value as bits 15 through 0. |

| HEX | 1 | 0 | | | | 7 | | | | F | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ |
| | 1 | x | x | x | x | x | 1 | 1 | 1 | 1 | 1 | 1 | 1 | a | a | a | a | a | a | a | a | a | a | a | x | x | x | x | x | x = Don't Care    a = Look-up Table Address

Table 34. ROUTE_HI Registers Address Bit Assignments

Table 35. ROUTE_HI Register Format

| Bits | Name | Description |
|---|---|---|
| 3 – 0 | ΔZ | These bits contain the two's complement of the number of hops the packet will make in the Z dimension. |
| 4 | ±Z | When set to 0, this bit indicates the packet will travel in the +Z direction. When set to 1, this bit indicates the packet will travel in the -Z direction. |
| 5 | ZVC Select Bit 0 | When set to 0, this bit indicates a request packet will use VC0 and a response packet will use VC1 in the Z dimension. When set to 1, this bit indicates a request packet will use VC 1 and a response packet will use VC 3 in the Z-dimension. |
| 15 – 6 | 0 | These bits are not used and should be set to 0's. |
| 31 – 16 | Repeated data | Bits 31 through 16 must be set to the same value as bits 15 through 0. |

Table 36. ROUTE_HI Register Format (continued)

| Bits | Name | Description |
|---|---|---|
| 47 – 32 | Repeated data | Bits 47 through 32 must be set to the same value as bits 15 through 0. |
| 63 – 48 | Repeated data | Bits 63 through 48 must be set to the same value as bits 15 through 0. |

Table 37. Read Data Acknowledgement

| Bits 2 – 0 | Acknowledgement Type |
|---|---|
| 000 | Idle |
| 100 | OK_NCACHE_NCHK |
| 101 | OK_NCACHE |
| 110 | OK_NCHK |
| 111 | OK |

Table 38. Address Memory-mapped Registers

| Address | Name | Description | Option | Terms |
|---|---|---|---|---|
| x10400000 | P_WHOAMI | Physical PE number register | AR option | ppe0 – 11 |
| x10450000 | L_WHOAMI | Logical PE number register | AM option | lpe00 – 11 |
| x10454000 | V_WHOAMI | Virtual PE number register | AM option | vpe1 – 10 |
| x10458000 | VRT_RG | Virtual PE range mask register | AM option | vrm01 – 10 |
| x106A0000 | X_WHOAMI | Network interface source register | EB option<br>EC option | a80 – 90<br>j0 – 10 |
| x106B0000 | LPE_XLATE | Network interface PE adjust register | EB option | l100 – 130 |
| x106F0000 | ROUTE_LO | Routing tag look-up table low-order bits register | Routing tag look-up table | q01 – 04 |
| x107F0000 | ROUTE_HI | Routing tag look-up table high-order bits register | Routing tag look-up table | q01 – 04 |

Table 39. Configuration Mask Values

| System | Z-Configuration Mask Bits 30 and 29 | Y-Configuration Mask Bits 28 and 27 | X-Configuration Mask Bits 26 and 25 |
|---|---|---|---|
| 128-PE CRAY T3D multiple-cabinet system | 11 | 11 | 00 |
| 256-PE CRAY T3D multiple-cabinet system | 10 | 11 | 00 |
| 512-PE CRAY T3D multiple-cabinet system | 00 | 11 | 00 |
| 1,024-PE CRAY T3D multiple-cabinet system | 00 | 10 | 00 |
| 2,048-PE CRAY T3D multiple-cabinet system | 00 | 00 | 00 |
| 128-PE CRAY T3D single-cabinet system | 10 | 11 | 10 |
| 256-PE CRAY T3D single-cabinet system | 00 | 11 | 10 |

| HEX | 1 | | | | 0 | | | | 6 | | | | F | | | | 0 | | | | 0 | | | | 0 | | | | 0 | | | |
|---|---|---|---|---|---|---|---|---|---|---|---|---|---|---|---|---|---|---|---|---|---|---|---|---|---|---|---|---|---|---|---|---|
| Binary | $2^{28}$ | $2^{27}$ | $2^{26}$ | $2^{25}$ | $2^{24}$ | $2^{23}$ | $2^{22}$ | $2^{21}$ | $2^{20}$ | $2^{19}$ | $2^{18}$ | $2^{17}$ | $2^{16}$ | $2^{15}$ | $2^{14}$ | $2^{13}$ | $2^{12}$ | $2^{11}$ | $2^{10}$ | $2^{9}$ | $2^{8}$ | $2^{7}$ | $2^{6}$ | $2^{5}$ | $2^{4}$ | $2^{3}$ | $2^{2}$ | $2^{1}$ | $2^{0}$ | | | |
| | 1 | x | x | x | x | x | 1 | 1 | 0 | 1 | 1 | 1 | 1 | a | a | a | a | a | a | a | a | a | a | a | x | x | x | x | x | | | | x = Don't Care   a = Look-up Table Address

Table 40. ROUTE_LO Register Address Bit Assignments

Table 41. LPE_XLATE Register Format

| Bits | Name | Description |
|---|---|---|
| 1 – 0 | Y shift | These bits contain the number of bits the virtual address must be shifted right to place the first bit assigned to the Y dimension in the $2^0$ bit location. |
| 4 – 2 | Z shift | These bits contain the number of bits the virtual address must be shifted right to place the first bit assigned to the Z dimension in the $2^0$ bit location. |
| 7 – 5 | X mask | These bits contain a right-justified field of 1's that indicate how many bits of the virtual address are assigned to the X dimension. The other bits are set to 0's. |
| 11 – 8 | Y mask | These bits contain a right-justified field of 1's that indicate how many bits of the virtual address are assigned to the Y dimension. The other bits are set to 0's. |
| 14 – 12 | Z mask | These bits contain a right-justified field of 1's that indicate how many bits of the virtual address are assigned to the Z dimension. The other bits are set to 0's. |
| 17 – 15 | X base | These bits contain the X-dimension portion of the logical node number corresponding to the smallest numbered virtual node in a partition. |
| 21 – 18 | Y base | These bits contain the Y-dimension portion of the logical node number corresponding to the smallest numbered virtual node in a partition. |
| 24 – 22 | Z base | These bits contain the Z-dimension portion of the logical node number corresponding to the smallest numbered virtual node in a partition. |
| 26 – 25 | X-configuration mask | These bits contain the X-dimension configuration mask. For more information on this mask, refer to Table 6-15. |
| 28 – 27 | Y-configuration mask | These bits contain the Y-dimension configuration mask. For more information on this mask, refer to Table 6-15. |
| 30 – 29 | Z-configuration mask | These bits contain the Z-dimension configuration mask. For more information on this mask, refer to Table 6-15. |
| 63 – 31 | Not used | These bits are not used. |

What is claimed is:

1. An address translation system for a multiprocessor computer system having a plurality of processing elements (PE's) interconnected by a n-dimensional interconnect network having virtual channels to route packets between nodes, and having a distributed memory made up of globally addressable portions of local memory associated locally with individual PE's, comprising:

means for defining physical addresses for the PE's and their associated local memory, corresponding to physical locations of the PE's within the multiprocessor computer system;

means operative under software control for defining logical addresses for PE's and their associated local memory within a logical configuration of PE's, the logical addresses corresponding to logical locations of PE's within a logical representation of the interconnect network;

means operative under software control for defining virtual addresses for PE's and their associated local memory within a user partition of PE's for running an application, corresponding to virtual locations of PE's within the user partition; and means coupled to the means for defining physical addresses, the means for defining logical addresses, and the means for defining virtual addresses for translating virtual addresses to logical addresses, and from logical addresses to physical addresses for routing on the interconnect network, wherein the physical addresses include information representing how many hops in the interconnect network to complete in each dimension, what direction to travel in each dimension, and which virtual channel, if any, to use in each dimension to arrive at the destination node.

2. The address translation system of claim 1 wherein the address translation system translates virtual addresses generated by PE's within the user partition.

3. The address translation system of claim 1 wherein the address translation system translates virtual addresses generated by a block transfer engine which redistributes data between the portions of globally addressable local memory without interrupting the PE's associated with said portions of local memory.

4. The address translation system of claim 1 wherein the means for translating includes operating system software for translating virtual addresses to logical addresses.

5. The address translation system of claim 1 wherein the means for translating includes hardware associated with each PE for translating virtual addresses to logical addresses.

6. The address translation system of claim 1 wherein the means for defining the logical address is modifiable to replace a failed PE within the logical configuration of PE's with a spare PE not included in the logical configuration by assigning the logical location of the failed PE to the spare PE.

7. A multiprocessor computer system comprising:

a plurality of processing nodes, each node including:

a processing element having a processor and a local memory, each processing element being identified by a physical number corresponding to a physical location of the processing element within the multiprocessor computer system, each processing element within a logical configuration of processing elements being identified by a logical number corresponding to a logical location of the processing element within the logical configuration, and each processing element within a user partition of processing elements for running an application being identified by a virtual number corresponding to a virtual location of the processing element within the user partition, a look-up table storing routing tags, and a network interface coupled to the processing element and the look-up table for generating packets of information to be provided to a destination node, wherein the network interface provides a selected logical number corresponding to the processing element of the destination node based on virtual or logical based information from a source node to index a routing tag corresponding to said selected logical number, wherein the routing tag includes physical number based information indicating a path from the source node to the destination node;

a n-dimensional interconnect network coupled to each network interface in each processing node to interconnect the plurality of processing nodes, and including virtual channels to route packets between nodes, and wherein the physical number based information in the routing tag includes information representing how many hops in the interconnect network to complete in each dimension, what direction to travel in each dimension, and which virtual channel, if any, to use in each dimension to arrive at the destination node; and a distributed memory including globally addressable portions of the local memory of each processing element.

8. The multiprocessor computer system of claim 7 wherein each processing element includes hardware for translating virtual number based information to logical number based information.

9. A multiprocessor computer system comprising:

a plurality of processing nodes, each node including:

a processing element having a processor and a local memory, each processing element being identified by a physical number corresponding to a physical location of the processing element within the multiprocessor computer system each processing element within a logical configuration of processing elements being identified by a logical number corresponding to a logical location of the processing element within the logical configuration, and each processing element within a user partition of processing elements for running an application being identified by a virtual number corresponding to a virtual location of the processing element within the user partition, a look-up table storing routing tags, and a network interface coupled to the processing element and the look-up table for generating packets of information to be provided to a destination node, wherein the network interface provides a selected logical number corresponding to the processing element of the destination node based on virtual or logical based information from a source node to index a routing tag corresponding to said selected logical number, wherein the routing tag includes physical number based information indicating a path from the source node to the destination node;

a n-dimensional interconnect network coupled to each network interface in each processing node to interconnect the plurality of processing nodes;

a distributed memory including globally addressable portions of the local memory of each processing element; and a host system compiling programs to be run in the plurality of processing nodes, wherein the routing tags for each node are generated by a program running on the host system based on a configuration file containing information on each node and the interconnect network connecting the nodes.

10. The multiprocessor computer system of claim 9 wherein the configuration file contains the logical configuration of processing elements which is modifiable to replace a failed node containing a processing element within the logical configuration with a spare node having a processing element not included in the logical configuration by assigning the logical number of the failed node to the spare node.

11. A multiprocessor computer system comprising:

a plurality of processing nodes, each node including:

a processing element having a processor and a local memory, each processing element being identified by a physical number corresponding to a physical location of the processing element within the multiprocessor computer system, each processing element within a logical configuration of processing elements being identified by a logical number corresponding to a logical location of the processing element within the logical configuration, and each processing element within a user partition of processing elements for running an application being identified by a virtual number corresponding to a virtual location of the processing element within the user partition, a look-up table storing routing tags, a network interface coupled to the processing element and the look-up table for generating packets of information to be provided to a destination node, wherein the network interface provides a selected logical number corresponding to the processing element of the destination node based on virtual or logical based information from a source node to index a routing tag corresponding to said selected logical number, wherein the routing tag includes physical number based information indicating a path from the source node to the destination node, and a block transfer engine for redistributing data between the globally addressable portions of local memory without interrupting the associated processors;

a n-dimensional interconnect network coupled to each network interface in each processing node to interconnect the plurality of processing nodes; and a distributed memory including globally addressable portions of the local memory of each processing element.

12. The multiprocessor computer system of claim 11 wherein the block transfer engine provides virtual number based information to the network interface, which translates the virtual number based information to logical number based information.

13. The multiprocessor computer system of claim 11 wherein the block transfer engine includes hardware for translating virtual number based information to logical number based information.

14. The multiprocessor computer system of claim 7 wherein operating system software running on the multiprocessor computer system assists in translating virtual number based information to logical number based information.

15. A multiprocessor computer system comprising:

a plurality of processing nodes, each node including:

a processing element having a processor and a local memory, each processing element being identified by a physical number corresponding to a physical location of the processing element within the multiprocessor computer system, each processing element within a logical configuration of processing elements being identified by a logical number corresponding to a logical location of the processing element within the logical configuration, and each processing element within a user partition of processing elements for running an application being identified by a virtual number corresponding to a virtual location of the processing element within the user partition, a look-up table storing routing tags, a network interface coupled to the processing element and the look-up table for generating packets of information to be provided to a destination node, wherein the network interface provides a selected logical number corresponding to the processing element of the destination node based on virtual or logical based information from a source node to index a routing tag corresponding to said selected logical number, wherein the routing tag includes physical number based information indicating a path from the source node to the destination node, and an annex table containing information indexed by a portion of an address provided by the associated processor to expand the addressing range of the processor to include all of the distributed memory;

a n-dimensional interconnect network coupled to each network interface in each processing node to interconnect the plurality of processing nodes; and a distributed memory including globally addressable portions of the local memory of each processing element.

16. A multiprocessor computer system comprising:

a plurality of processing nodes, each node including:

a processing element having a processor and a local memory, each processing element being identified by a physical number corresponding to a physical location of the processing element within the multiprocessor computer system, each processing element within a logical configuration of processing elements being identified by a logical number corresponding to a logical location of the processing element within the logical configuration, and each processing element within a user partition of processing elements for running an application being identified by a virtual number corresponding to a virtual location of the processing element within the user partition, a look-up table storing routing tags, and a network interface coupled to the processing element and the look-up table for generating packets of information to be provided to a destination node, wherein the network interface provides a selected logical number corresponding to the processing element of the destination node based on virtual or logical based information from a source node to index a routing tag corresponding to said selected logical number, wherein the routine tag includes physical number based information indicating a path from the source node to the destination node;

a n-dimensional interconnect network coupled to each network interface in each processing node to interconnect the plurality of processing nodes;

a distributed memory including globally addressable portions of the local memory of each processing element; and a plurality of network routers, each network router being coupled to a corresponding network interface of a processing node and to the interconnect network, and each network router including n types of dimension switches corresponding to each of the n dimensions of the interconnect network, the dimension switches being responsive to the routing tag for routing the packets of information from the source node to the destination node along the interconnect network.

17. The multiprocessor computer system of claim 16 wherein the routing tag includes n groups of delta bits corresponding to the n dimensions of the interconnect network, wherein each group of delta bits represents a distance to travel to arrive at the destination node in the corresponding dimension and wherein the network router shifts a first one of the groups of delta bits corresponding to a first dimension into bit locations in the routing tag previously occupied by a second one of the groups of delta bits corresponding to a second dimension when the routing tag is transferred between a second dimension switch corresponding to the second dimension and a first dimension switch corresponding to the first dimension so that one hardware design can be repeated to implement the first dimension switch and the second dimension switch.

18. A method of translating addresses in a multiprocessor computer system having a plurality of processing elements (PE's) interconnected by a n-dimensional interconnect network having virtual channels to route packets between nodes, and having a distributive memory made up of globally addressable portions of local memory associated locally with individual PE's, the method comprising:

(A) defining physical addresses for the PE's and their associated local memory, the physical addresses corresponding to physical locations of the PE's within the multiprocessor computer system;

(B) defining logical addresses for PE's and their associated local memory within a logical configuration of PE's, the logical addresses corresponding to logical locations of PE's (C) defining virtual addresses for PE's and their associated local memory within a user partition of PE's for running an application corresponding to virtual locations of PE's within the user partition;

(D) translating virtual addresses defined in step (C) to logical addresses defined in step (B); and (E) translating said logical addresses translated in step (D) to physical addresses defined in step (A) for routing on the interconnect network, wherein the physical addresses include information representing how many hops in the interconnect network to complete in each dimension, what direction to travel in each dimension, and which virtual channel, if any, to use in each dimension to arrive at the destination node.

19. The method of claim 18 further comprising the step of replacing a failed PE within the logical configuration of PE's with a spare PE not included in the logical configuration by assigning the logical location of the failed PE to the spare PE.

* * * * *

UNITED STATES PATENT AND TRADEMARK OFFICE
CERTIFICATE OF CORRECTION

PATENT NO. : 5,784,706
DATED : July 21, 1998
INVENTOR(S) : Steven M. Oberlin et al.

It is certified that error appears in the above-identified patent and that said Letters Patent is hereby corrected as shown below:

At Col. 54, line 39, Claim 12, please delete "computer system each" and insert --computer system, each--.

At Col. 58, line 6, Claim 21, please delete "of PE's" and insert --of PE's within a logical representation of the interconnect network;--.

Signed and Sealed this

Eighteenth Day of May, 1999

Attest:

Q. TODD DICKINSON

*Attesting Officer*    Acting Commissioner of Patents and Trademarks